US010384086B2

(12) United States Patent
Kekahuna et al.

(10) Patent No.: US 10,384,086 B2
(45) Date of Patent: Aug. 20, 2019

(54) CONNECTING AND ANCHORING DEVICE

(71) Applicant: Climb Tech, LLC, Austin, TX (US)

(72) Inventors: Ivan A. J. Kekahuna, Austin, TX (US); Daniel Aleksovski, Austin, TX (US); Sarah Rose Huntley-Horning, Franktown, CO (US); Brian John Bourquin, Lakewood, CO (US)

( * ) Notice: Subject to any disclaimer, the term of this patent is extended or adjusted under 35 U.S.C. 154(b) by 0 days.

(21) Appl. No.: 16/012,550

(22) Filed: Jun. 19, 2018

(65) Prior Publication Data

US 2019/0022437 A1 Jan. 24, 2019

Related U.S. Application Data

(63) Continuation-in-part of application No. 16/003,437, filed on Jun. 8, 2018, and a continuation-in-part of
(Continued)

(51) Int. Cl.
*A62B 35/00* (2006.01)
*A63B 27/00* (2006.01)

(52) U.S. Cl.
CPC .......... *A62B 35/0068* (2013.01); *A63B 27/00* (2013.01); *Y10T 24/44427* (2015.01); *Y10T 24/44538* (2015.01); *Y10T 24/44564* (2015.01)

(58) Field of Classification Search
CPC . A62B 35/0068; A62B 35/0037; A62B 27/00; A62B 35/0075; F16B 45/02;
(Continued)

(56) References Cited

U.S. PATENT DOCUMENTS 802,537 A 10/1905 Uren
3,748,703 A 7/1973 Maillocheau
(Continued)

FOREIGN PATENT DOCUMENTS

DE 3312847 10/1984
DE G87 145 946 3/1988
(Continued)

OTHER PUBLICATIONS

WIPO, International Search Report and Written Opinion, Application No. PCT/US17/12033, dated Mar. 27, 2017.
(Continued)

*Primary Examiner* — Robert Sandy
*Assistant Examiner* — Rowland Do
(74) *Attorney, Agent, or Firm* — Birdwell & Janke, LLP

(57) ABSTRACT

A connecting and anchoring device. A cable element terminates at opposite ends in respective gate and spine cable termination structures. A gate housing houses a gating portion of the cable element and includes a locking element. The device has a first configuration in which the termination structures are locked together and a second configuration in which the termination structures can be separated from one another by manipulating the locking element. The device in at least the first configuration defines a closed aperture. A spine housing houses a spinal portion of the cable element. The spine housing is attached to the base and the gate housing is pivotally connected to the base so that the gate housing can pivot relative to the spine housing so as to change the configuration of the connecting and anchoring device between the second configuration and a third configuration in which the aperture is open. The cable element includes a cable that extends uninterrupted from the spine housing, through the base, and into the gate housing.

24 Claims, 29 Drawing Sheets

Related U.S. Application Data application No. PCT/US2017/038147, filed on Jun. 19, 2017, said application No. 16/003,437 is a continuation-in-part of application No. PCT/US2017/038147, filed on Jun. 19, 2017, which is a continuation-in-part of application No. PCT/US2017/012033, filed on Jan. 3, 2017, and a continuation-in-part of application No. 15/395,768, filed on Dec. 30, 2016, said application No. PCT/US2017/012033 is a continuation of application No. 15/395,768, filed on Dec. 30, 2016.

(60) Provisional application No. 62/273,960, filed on Dec. 31, 2015.

(58) Field of Classification Search
CPC ........ F16B 45/00; F16B 45/025; F16B 45/04; F16B 45/06; Y10T 24/45277; Y10T 24/45361; Y10T 24/45257; Y10T 24/45366; Y10T 24/45372; Y10T 24/44427; Y10T 24/44538; Y10T 24/44564; Y10S 24/35

See application file for complete search history.

(56) References Cited

U.S. PATENT DOCUMENTS

| | | | |
|---|---|---|---|
| 4,811,467 A | 3/1989 | Lowe | |
| 4,835,823 A | 6/1989 | Contat | |
| 5,505,013 A | 4/1996 | Gios | |
| 5,517,735 A | 5/1996 | Tsai | |
| 5,588,188 A | 12/1996 | Jermyn, Jr. | |
| 5,608,953 A | 3/1997 | Petzl | |
| 5,638,584 A * | 6/1997 | De Anfrasio | B62J 7/08 24/265 H |
| 5,752,416 A | 5/1998 | Nien | |
| 5,878,834 A | 3/1999 | Brainerd | |
| 6,173,477 B1 | 1/2001 | Kikutani | |
| 6,912,836 B2 | 7/2005 | Hsu | |
| 7,032,529 B2 | 4/2006 | Sanford | |
| 7,353,571 B2 | 4/2008 | Goldberg | |
| 7,481,404 B2 | 1/2009 | Carnevali | |
| 7,946,005 B2 * | 5/2011 | Lee | F16B 45/00 24/582.11 |
| 8,402,616 B2 | 3/2013 | Petzl | |
| 8,752,254 B2 | 6/2014 | Perner | |
| 9,004,414 B2 | 4/2015 | Durben | |
| 9,121,437 B1 | 9/2015 | Carnicle | |
| 9,249,602 B1 | 2/2016 | Greer | |
| 9,370,169 B2 | 6/2016 | Finlan | |
| 9,861,839 B2 | 1/2018 | Perner | |
| 2003/0106190 A1 | 6/2003 | Christianson | |
| 2005/0067444 A1 | 3/2005 | Whitby | |
| 2005/0193532 A1 | 9/2005 | Chang | |
| 2011/0240403 A1 | 10/2011 | Meillet | |
| 2012/0042478 A1 | 2/2012 | Bridges | |
| 2012/0104187 A1 | 5/2012 | Kramer | |
| 2013/0219673 A1 | 8/2013 | Perner | |
| 2015/0231423 A1 | 8/2015 | Perner | |
| 2017/0021556 A1 | 1/2017 | Rinklake | |
| 2017/0159698 A1 | 6/2017 | Locker | |
| 2017/0307004 A1 | 10/2017 | Cardella | |

FOREIGN PATENT DOCUMENTS

| | | |
|---|---|---|
| DE | 29610293 | 12/1996 |
| DE | 10 2009 023 937 | 12/2010 |
| DE | 20 2014 104 023 | 9/2014 |
| EP | 2387905 | 11/2011 |
| EP | 3120990 | 7/2016 |
| GB | 2 058 901 | 4/1981 |
| TW | 200846560 | 12/2008 |
| WO | WO 91/04077 | 4/1991 |
| WO | WO 01/65129 | 2/2000 |
| WO | WO 2009/037107 | 3/2009 |
| WO | WO 2017/032975 | 3/2017 |

OTHER PUBLICATIONS

WIPO, International Search Report and Written Opinion, Application No. PCT/US17/038147, dated Aug. 22, 2017.
WIPO, International Search Report and Written Opinion, Application No. PCT/US18/38346, dated Sep. 18, 2018.
Intreprid Industries, Inc., Cablesafe Safety Hook (CS), 4 pages, date unknown.

* cited by examiner

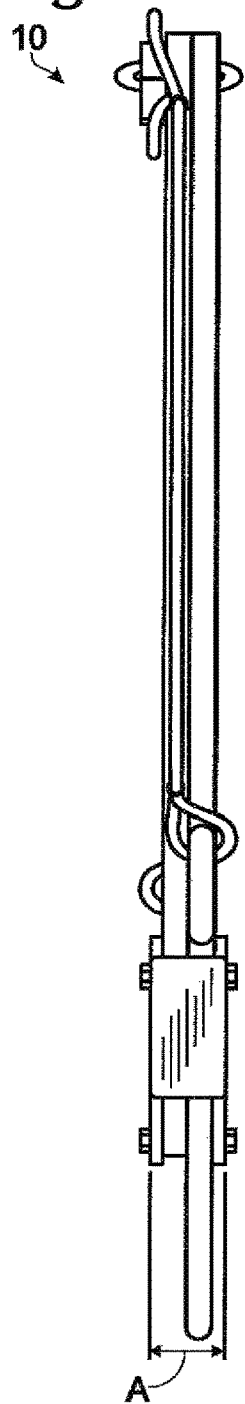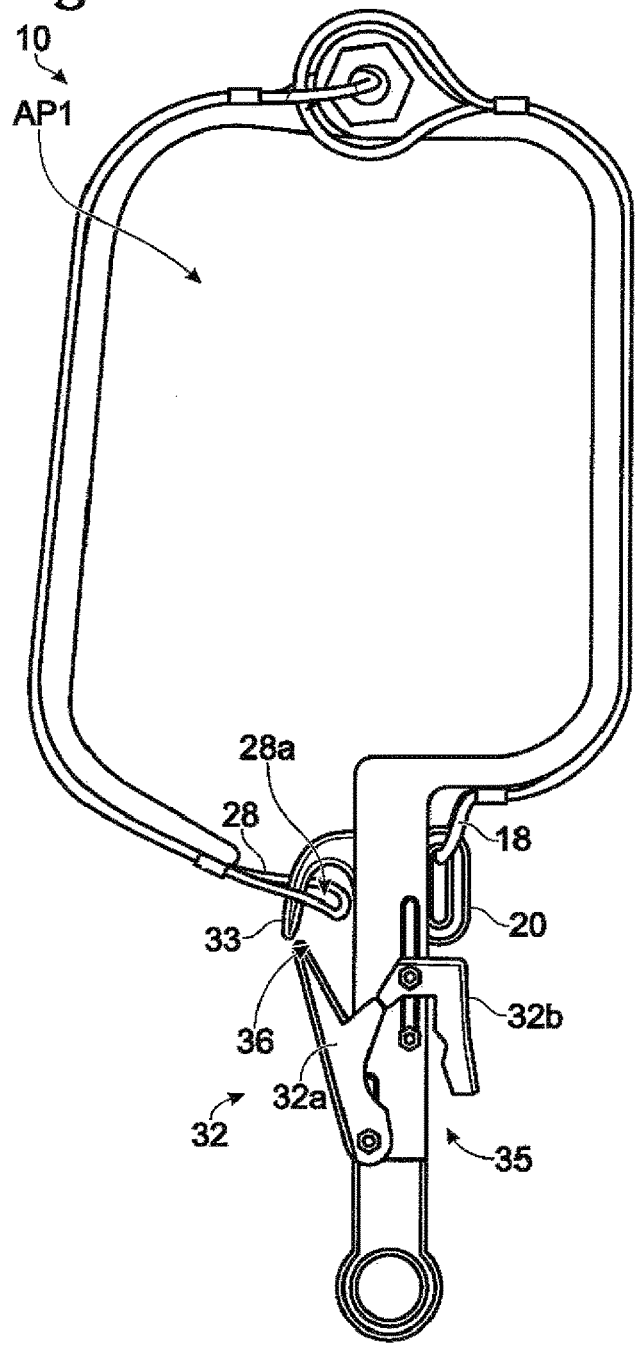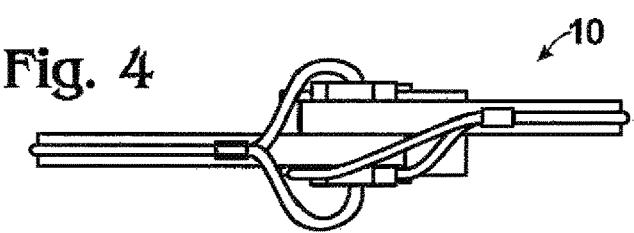

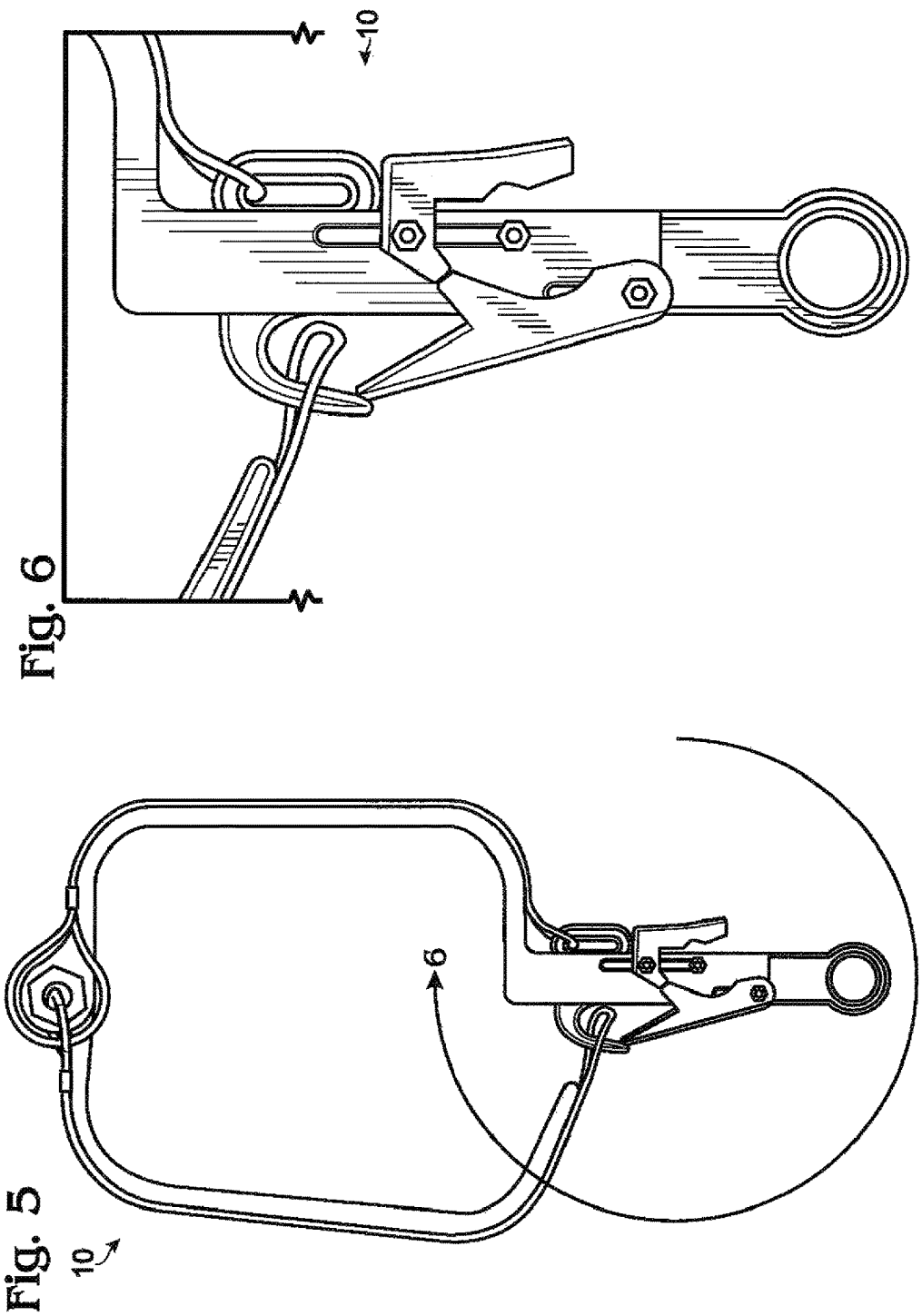

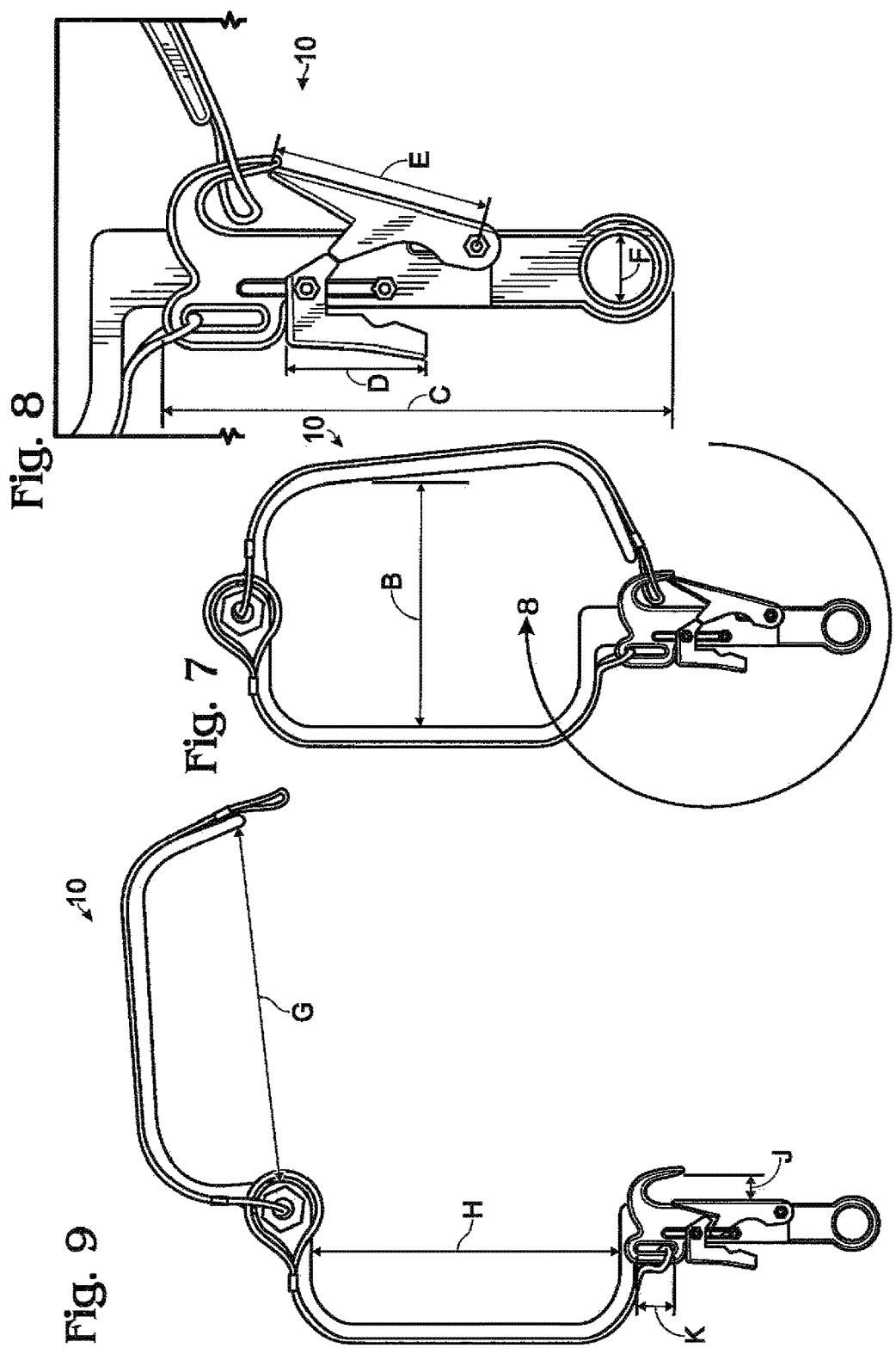

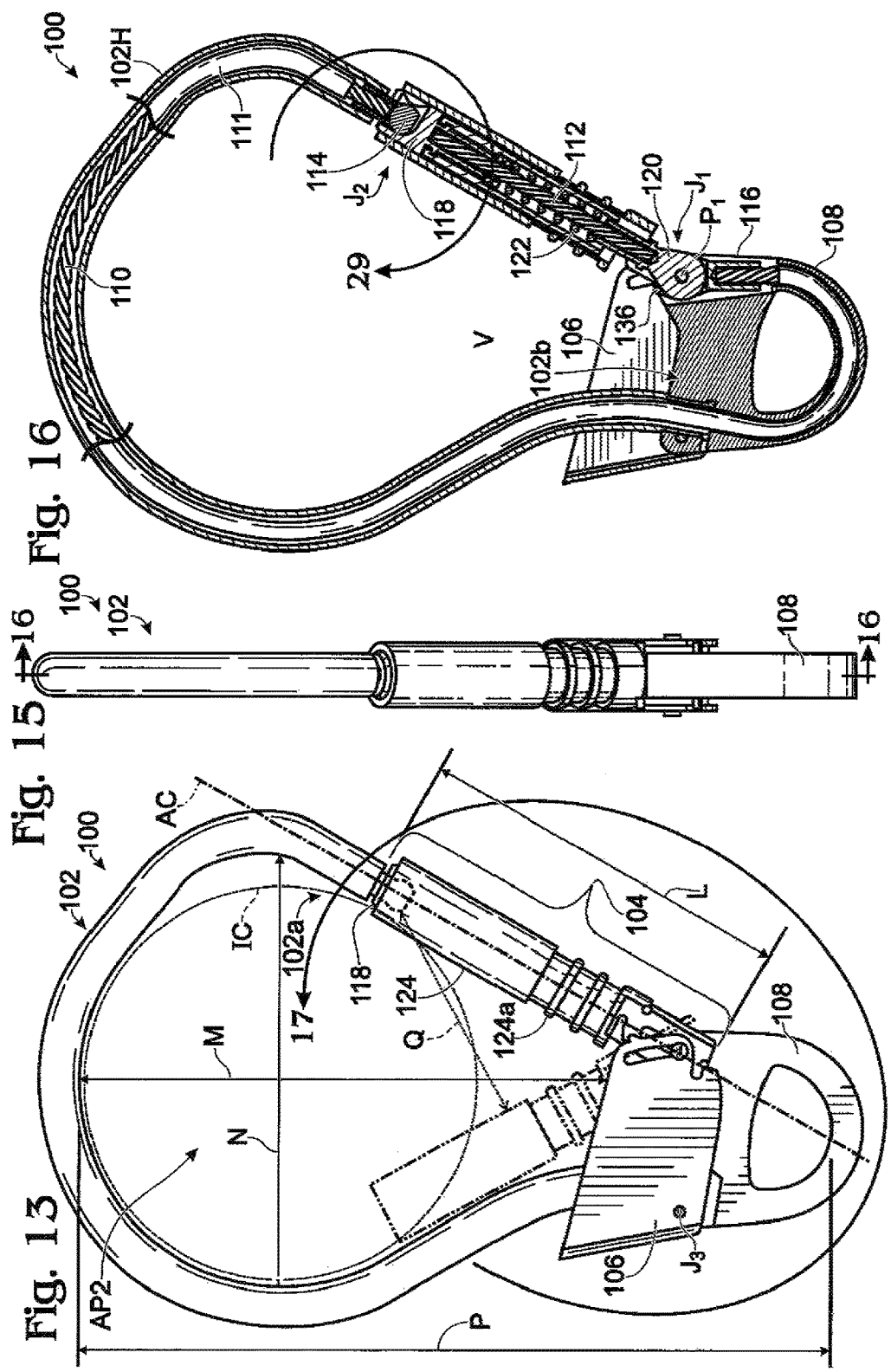

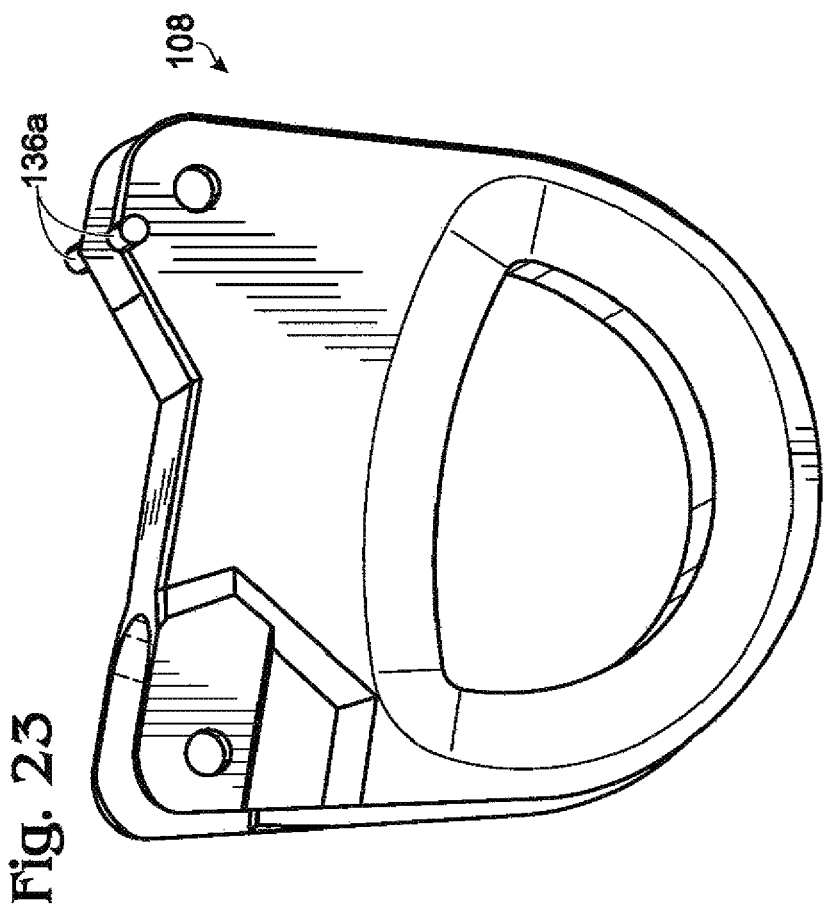
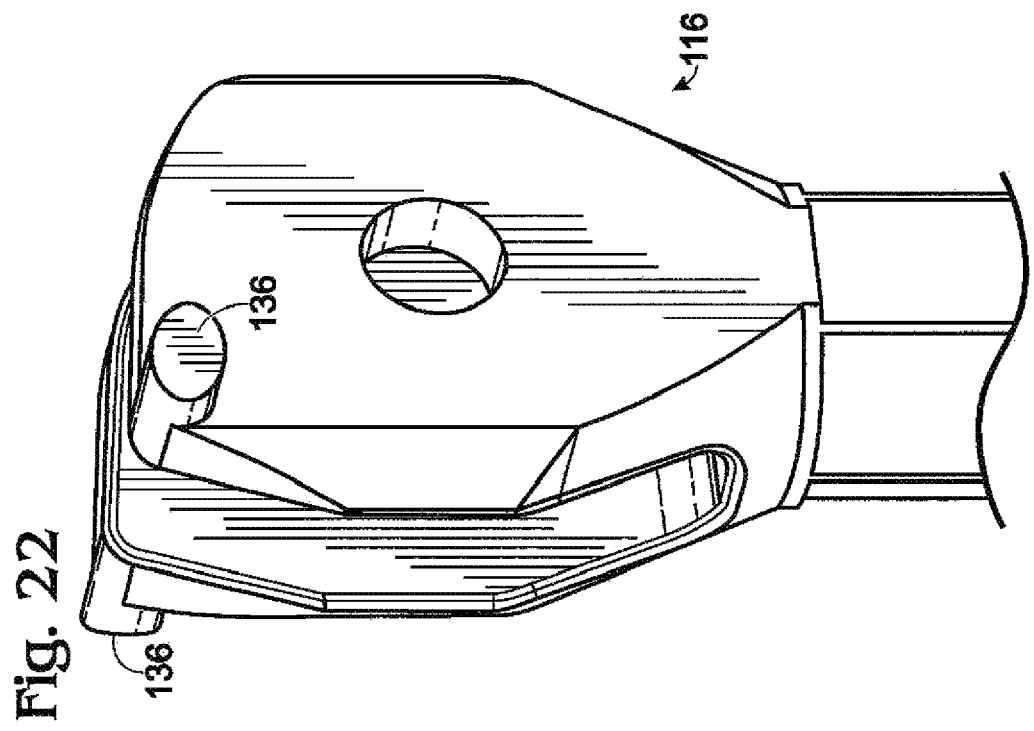

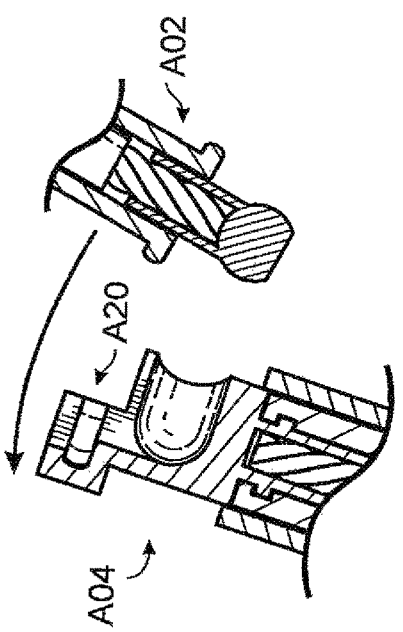
Fig. 30
Fig. 29
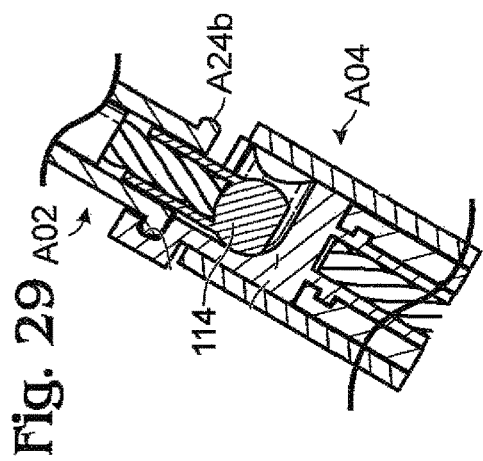
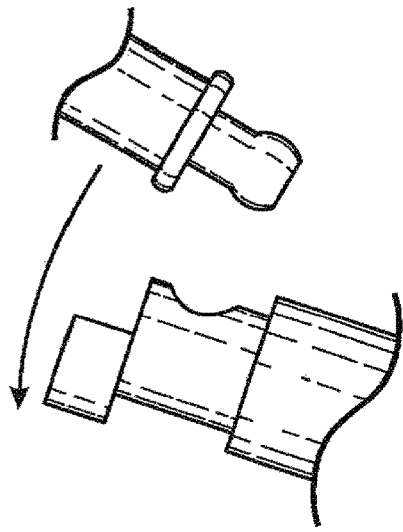
Fig. 32
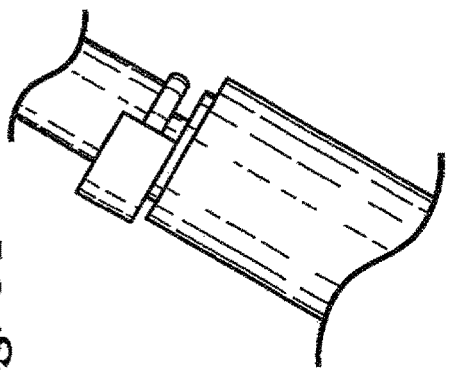
Fig. 31

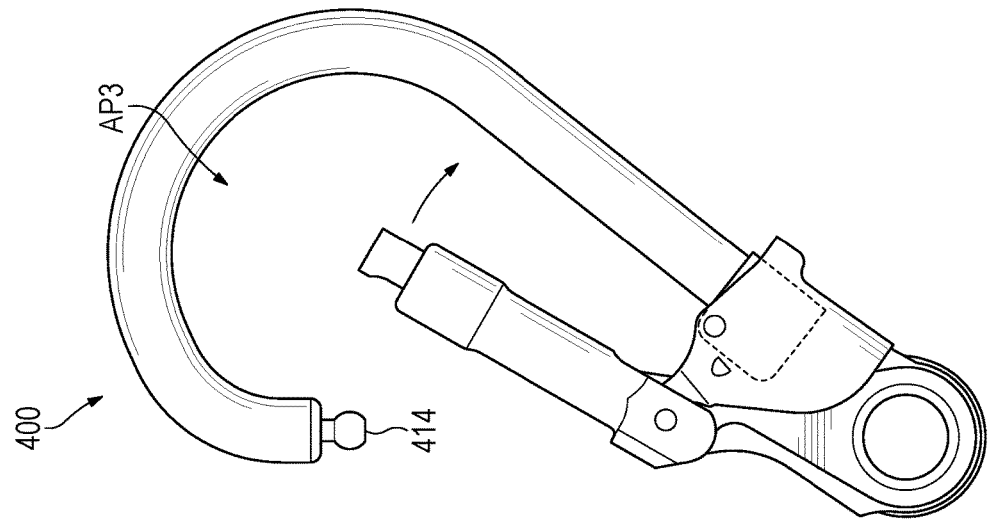
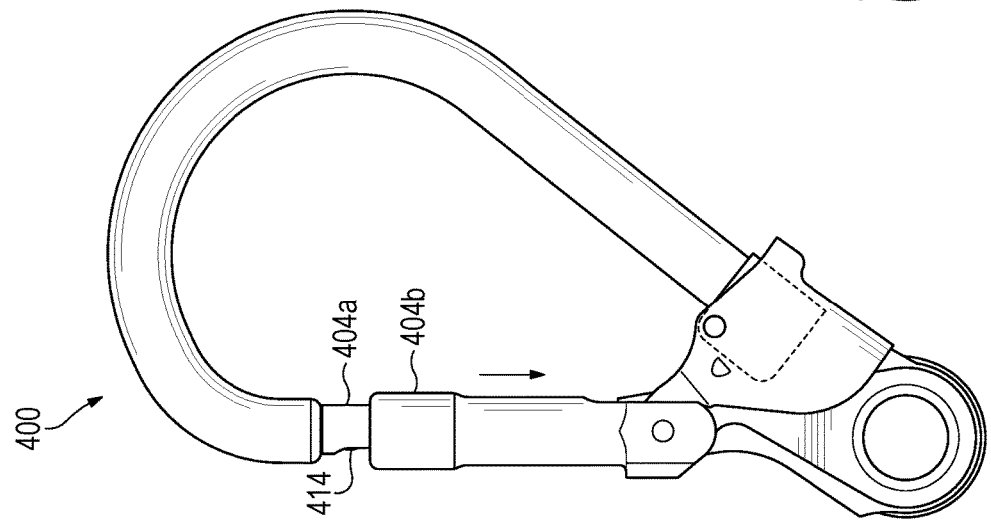
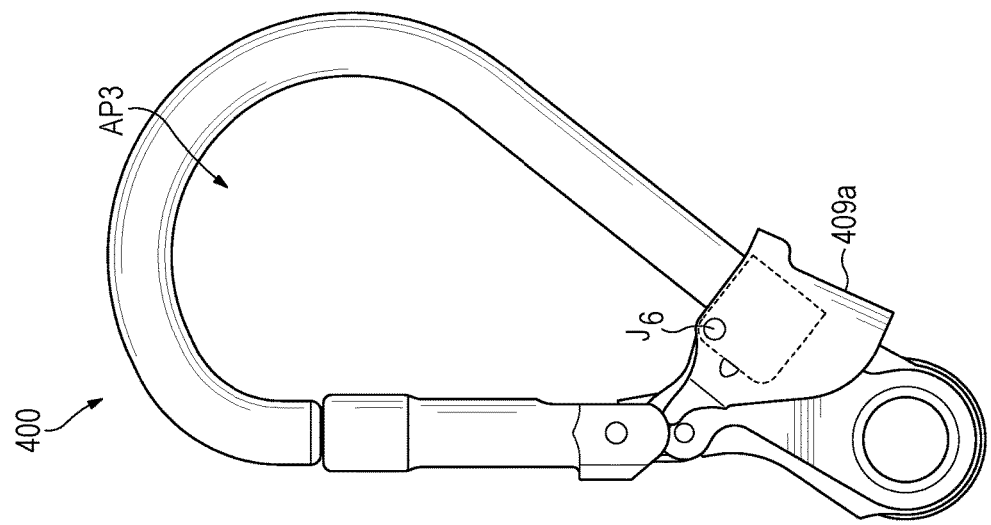

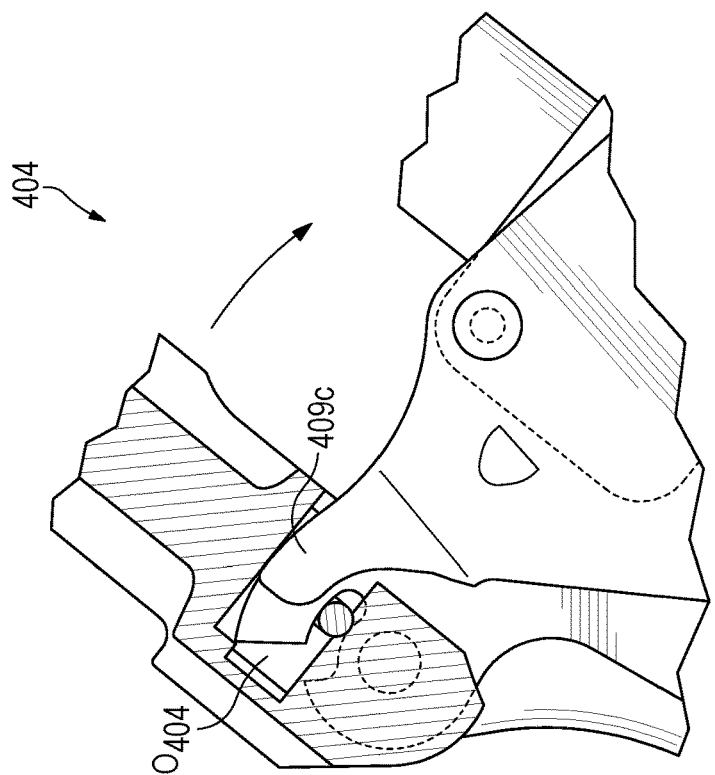
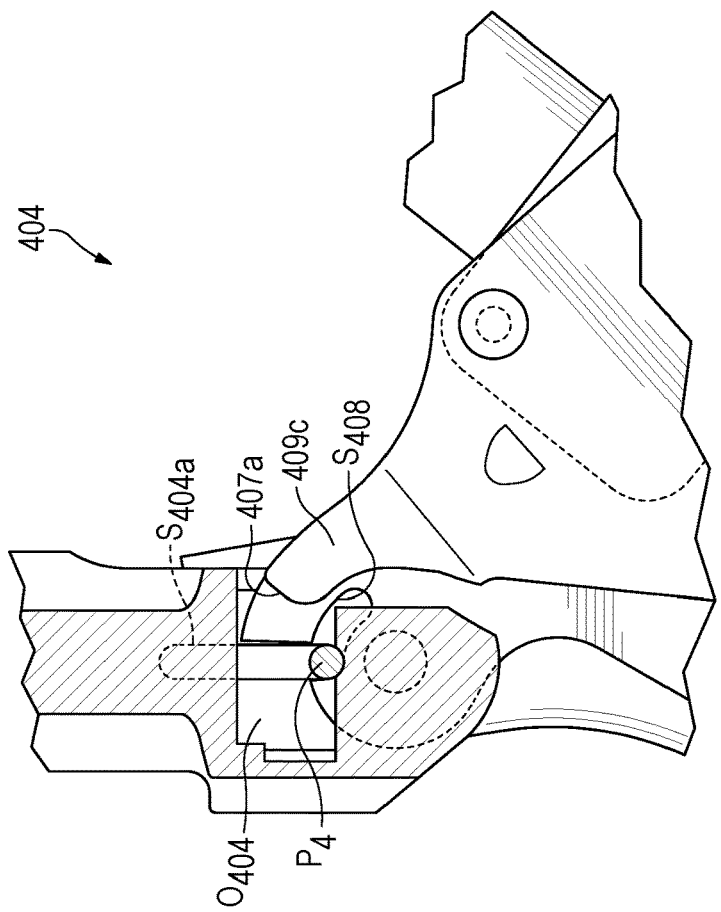

CONNECTING AND ANCHORING DEVICE

RELATED APPLICATIONS

This application claims the benefit of U.S. nonprovisional application Ser. No. 16/003,437, filed Jun. 8, 2018, which is continuation-in-part of, and claims the benefit of, PCT application No. PCT/US2017/038147, which designates the United States and was filed Jun. 19, 2017, which is a continuation-in-part of, and claims the benefit of, PCT application No. PCT/US2017/012033, which designates the United States and was filed Jan. 3, 2017, and U.S. non provisional application Ser. No. 15/395,768, which was filed Dec. 30, 2016. The '147 application claims priority of the '033 application and the '768 application; the '033 application claims the benefit of the '768 application; and both the '033 and '768 applications claim the benefit of U.S. provisional application No. 62/273,960, filed Dec. 31, 2015.

FIELD OF INVENTION

The present invention relates to a connecting and anchoring device, such as for connecting and anchoring a worker to a structure such as utility pole or cellular tower and thereby providing fall protection for the worker.

BACKGROUND

Utility poles support overhead power lines and various other utilities (e.g., mobile network antennas, street lights, traffic lights, power for train lines) and related equipment (e.g., transformers and street lights) to keep the cables and other equipment insulted from the ground and out of the way. The standard utility pole in the United States is about 40 feet tall and is buried about 6 feet into the ground. However, utility poles and other structures can reach heights of 120 feet or more to satisfy clearance requirements.

When there is a problem with the utility, a person often has to determine and fix the problem. While bucket trucks may be able to reach some utility poles and other structures, often bucket trucks either cannot reach the utility pole (e.g., cannot be driven into the area where the utility pole is) and/or the bucket cannot reach the height of the utility pole.

As such, a line worker is often needed to climb the utility pole or other structure. However, climbing a utility pole or other structure can be very dangerous. The line worker will often use a snap hook and carabiner. But these can be heavy, causing fatigue and the risk that the line worker just does not want to carry these, thereby foregoing safety.

SUMMARY

A connecting and anchoring device is disclosed herein. In a first embodiment, the connecting and anchoring device includes a first arm, a second arm, a first cable, and a second cable. The second arm is hinged to the first arm so that the second arm swings open. The first cable is provided in a channel formed in the first arm and connected at a first loop to a first attachment. The second cable is provided in a channel in the second arm and connected by a second loop on one end to an opening formed in the hinge. The second cable is connected by another loop to another attachment, and the first cable is connected to the second cable by interconnecting a loop of the first cable with a loop of the second cable.

Optionally, the device may include a double action snap hook.

Optionally, the device may have an opening to connect to a line or other connection.

Optionally, the device may be formed of an aluminum shape that has a groove in it.

Optionally, the cables may be wire rope.

In addition, where the cables are wire rope, a combination of rated and non-rated materials may optionally be connected together using a small snap hook style connecting device that conforms to art-relevant Industrial Safety Standards, such as ANSI standards.

In a second embodiment disclosed herein, the connecting and anchoring device includes a cable element and one or more housings for the cable element. The cable element terminates at opposite ends thereof in respective gate and spine cable termination structures. The one or more housings include a gate housing for housing a gating portion of the cable element, which may be proximate the gate cable termination structure. The gate housing includes a manipulable locking element. The gate and spine cable termination structures have a set of complementary mating shapes or structures and the connecting and anchoring device is configured to provide for changing between a first configuration thereof in which the complementary mating shapes or structures are locked together so as to inhibit separation thereof, and a second configuration in which the complementary mating shapes or structures can be freely separated from one another as a consequence of manipulating the locking element. The device, in at least the first configuration, defines a closed aperture therethrough.

Optionally, the cable element may be provided as a chain of cables, and further, may include at least two separate lengths of cable pivotally connected to each other at a pivot joint.

Optionally, the locking element may be subject to a first spring bias that biases the locking element in a locking position for maintaining the gate and spine cable termination structures in the first configuration.

Optionally, the connecting and anchoring device may be configured so that the locking element must be forced into a retracted position, against the first spring bias, to place the connecting and anchoring device in the second configuration.

Optionally, the device may be configured so that the locking element must be pivoted to place the connecting and anchoring device in a third configuration of the connecting and anchoring device in which the aperture is open.

Optionally, the device may be configured so that the locking element must be moved linearly to the base to place the connecting and anchoring device in the second configuration.

Optionally, the device may be configured so that the locking element must be retracted to place the connecting and anchoring device in the second configuration.

Optionally, the one or more housings may include a spine housing for housing a corresponding spinal portion of the cable element, and the gate housing may be pivotally connected to the connecting and anchoring device so that the gate housing can pivot relative to the spine housing in response to manual manipulation of the connecting and anchoring device so as to change the configuration of the connecting and anchoring device between the second configuration and a third configuration of the connecting and anchoring device in which the aperture is open.

Optionally, the device may be configured so that the gate housing must be pivoted against a second spring bias to change the configuration of the connecting and anchoring device from the second configuration to the third configuration.

Optionally, the device may have a base and a latch connected to the base, the base attached to at least one of the one or more housings, the latch configured to cooperate with the locking element to obstruct movement of the locking element into the retracted position until the latch is manipulated.

Optionally, the latch may be pivotally connected to the base and configured to obstruct movement of the locking element into the retracted position until the latch is manually pivoted.

Optionally, either the latch or the base may include a stop pin situated for stopping the pivoting at a predetermined amount, and wherein the locking element is configured to receive the stop pin at least when the pivoting has reached the predetermined amount and thereby retain the locking element in the retracted position.

Optionally, the gate cable termination structure and the spine housing have a second set of complementary mating shapes or structures, the device configured so that the complementary mating shapes or structures of the second set are locked together so as to inhibit separation thereof in the first configuration of the connecting and anchoring device, and the complementary mating shapes or structures of the second set can be freely separated from one another in the second configuration.

In a third embodiment, the connecting and anchoring device may have a base attached to at least one of the one or more housings, the base having a guide element configured to cooperate with a key structure of the locking element so as to guide the locking element as the locking element is placed in the retracted position, and so as to allow for pivoting the locking element after, but not to allow for pivoting the locking element before, the locking element has reached the retracted position.

Optionally, the guide element may be configured to cooperate with the key structure of the locking element so as to maintain the locking element in the retracted position after the locking element has been pivoted.

Optionally, the guide element and key structure may be configured to constrain the locking element to move along a linear path toward the retracted position.

Optionally in all embodiments, at least a portion of the cable element may be sheathed in one or more materials that, in comparison thereto, satisfy at least one of the following conditions: (a) the one or more materials as provided are substantially less dense, (b) the one or more materials as provided are capable of undergoing substantially greater plastic deformation, and (c) the one or more materials as provided have a substantially greater electrical resistivity. Polymeric materials are disclosed in preferred embodiments.

In a fourth embodiment disclosed herein, the connecting and anchoring device includes a base, a cable element, a gate housing, and a spine housing.

The cable element terminates at opposite ends thereof in respective gate and spine cable termination structures.

The gate housing houses a gating portion of the cable element, and includes a manually manipulable locking element. The device provides for changing between a first configuration of the device in which the termination structures are locked together so as to inhibit separation thereof, and a second configuration in which the termination structures can be freely separated from one another by manipulation of the locking element. The device in at least the first configuration defines a closed aperture therethrough.

The spine housing houses a spinal portion of the cable element. The gate housing can pivot about a pivot joint relative to the spine housing in response to manual manipulation of the connecting and anchoring device so as to change the configuration of the connecting and anchoring device between the second configuration and a third configuration of the connecting and anchoring device in which the aperture is open.

Optionally, the cable element includes a cable that extends uninterrupted from the spine housing and into the gate housing, past the pivot joint, or the cable element may extend uninterrupted between the gate termination structure and the spine termination structure so as to form a single cable loop.

Optionally, the locking element is subject to a first spring bias that biases the locking element in a locking position for maintaining the gate and spine cable termination structures in the first configuration of the connecting and anchoring device.

Optionally, the locking element must be forced into a retracted position, against the first spring bias, to place the connecting and anchoring device in the second configuration.

Optionally, the locking element must be pivoted to place the connecting and anchoring device in the third configuration.

Optionally, the apparatus includes a safety mechanism configured for preventing the locking element from being placed in the retracted position unless the safety mechanism is pivoted relative to the spine housing against a second spring bias, thereby to achieve a triggered configuration of the safety mechanism.

Optionally, enabling the gate housing for pivoting relative to the spine housing in the third configuration of the connecting and anchoring device requires holding the safety mechanism in the triggered configuration of the safety mechanism.

Optionally, enabling the gate housing for pivoting relative to the spine housing in the third configuration of the connecting and anchoring device also requires holding the locking element in the retracted configuration of the locking element.

Optionally, the apparatus includes a base to which the gate and spine housings are connected, wherein the locking element and the base have corresponding male and female mating features that mutually engage as the gate housing is pivoted relative to the base in the third configuration of the device, and wherein the male and female mating features are configured to allow the gate housing to pivot about the base while maintaining the safety mechanism in the triggered configuration.

Optionally, one of the gate termination structure and the spine termination structure includes a capturing element for receiving, in a void area of said capturing element, the other of the gate termination structure and the spine termination structure in the first and second configurations of the connecting and anchoring device.

Optionally, the capturing element is slidably retained on the cable element.

Also disclosed herein are weakening features that may be provided on one or more of the housings in any of the embodiments described above or otherwise described herein.

In a particular embodiment in which such weakening features are disclosed, a cable element comprises one or more cables, a gate cable termination structure, and a spine cable termination structure. One of the one or more cables enters the spine cable termination structure at a first point of entry, and the same or a different one of the one or more cables enters the gate cable termination structure at a second point of entry. Each of the one or more cables has a respective nominal diameter.

One or more housings for the one or more cables of the cable element are also provided, including a gate housing for housing a gating portion of the cable element that includes the gate cable termination structure and a spine housing for housing a spinal portion of the cable element that includes the spine cable termination structure.

The one or more housings may be relatively weak compared to the respective one or more cables. In addition, at least one of the gate and spine housing may be provided with a weakening feature configured to ensure deformation and/or failure thereof under a bending load no closer to the associated point of entry to the associated cable termination structure than a distance of about ¼ of the nominal diameter of the cable terminated therein.

Optionally, at least one weakening feature is provided on the gate housing.

Optionally, at least one weakening feature is provided on the spine housing.

Optionally, at least one weakening feature is provided on each of the gate and spine housings.

Optionally, the cable element comprises a spine cable terminating in the spine cable termination structure and a gate cable terminating in the gate cable termination structure, the spine and gate cables forming all or part of a chain of cables. The spine and gate cables may but need not necessarily have the same nominal diameter.

It is contemplated that any of the optional features disclosed above, as well as any other features disclosed herein, may be provided in any embodiment in combination with any other(s) of such features to the extent that they are not mutually exclusive.

It is to be understood that this summary is provided as a means of generally determining what follows in the drawings and detailed description and is not intended to limit the scope of the invention. Objects, features and advantages of the invention will be readily understood upon consideration of the following detailed description taken in conjunction with the accompanying drawings.

BRIEF DESCRIPTION OF DRAWINGS

FIG. 2 is a side view of the example connecting and anchoring device of FIG. 1.

FIG. 3 is front view of the example connecting and anchoring device of FIG. 1.

FIG. 4 is a top view of the example connecting and anchoring device of FIG. 1.

FIG. 5 is a plan view of an example connecting and anchoring device.

FIG. 6 is a close-up view of an example double action snap hook from detail A in FIG. 5.

FIG. 7 is a plan view of an example connecting and anchoring device.

FIG. 8 is a close-up view of an example double action snap hook from detail B in FIG. 7.

FIGS. 9-12 illustrate operation of an example connecting and anchoring device.

FIG. 13 is a plan view of a second embodiment of a connecting and anchoring device according to the present invention, shown in a closed configuration.

FIG. 15 is a side view of the connecting and anchoring device of FIGS. 13 and 14.

FIG. 16 is a section view of the connecting and anchoring device of FIGS. 13 and 14, taken along the line 16-16 of FIG. 15.

FIG. 22 is an isometric view of a spine base termination according to the present invention, showing a stop pin attached thereto according to one embodiment of the invention.

FIG. 23 is an isometric view of a base according to the present invention, showing, in contrast to stop pin of FIG. 22, a stop pin attached thereto according to an alternative embodiment of the invention.

FIG. 29 is a cross-sectional view of a portion of the device as shown in FIG. 13, with an additional set of complementary mating shapes or structures according to the invention for releasably connecting a gate portion of the device to a spine portion.

FIG. 30 is a cross-sectional view of the same portion of the device as shown in FIG. 29, showing the gate portion pivoted away from the spine portion after having been released therefrom.

FIGS. 31 and 32 are solid views corresponding to FIGS. 29 and 30, respectively.

FIG. 50 is an elevation view of the connecting and anchoring device of FIG. 49, in a closed and locked configuration.

FIG. 51 is an elevation view of the connecting and anchoring device of FIG. 49, in a closed but unlocked configuration.

FIG. 52 is an elevation view of the connecting and anchoring device of FIG. 49, in an open configuration.

FIG. 59 is a detailed view corresponding to that of FIGS. 57 and 58, showing a next step of operation of the connecting and anchoring device after that shown in FIG. 58, in which the gate is now in a retracted position.

FIG. 60 is a detailed view corresponding to those of FIGS. 57-59, showing a next step of operation of the connecting and anchoring device after that shown in FIG. 59, in which the device is now in an open configuration achieved by pivoting the gate.

DESCRIPTION OF PREFERRED EMBODIMENTS

Figure 1:
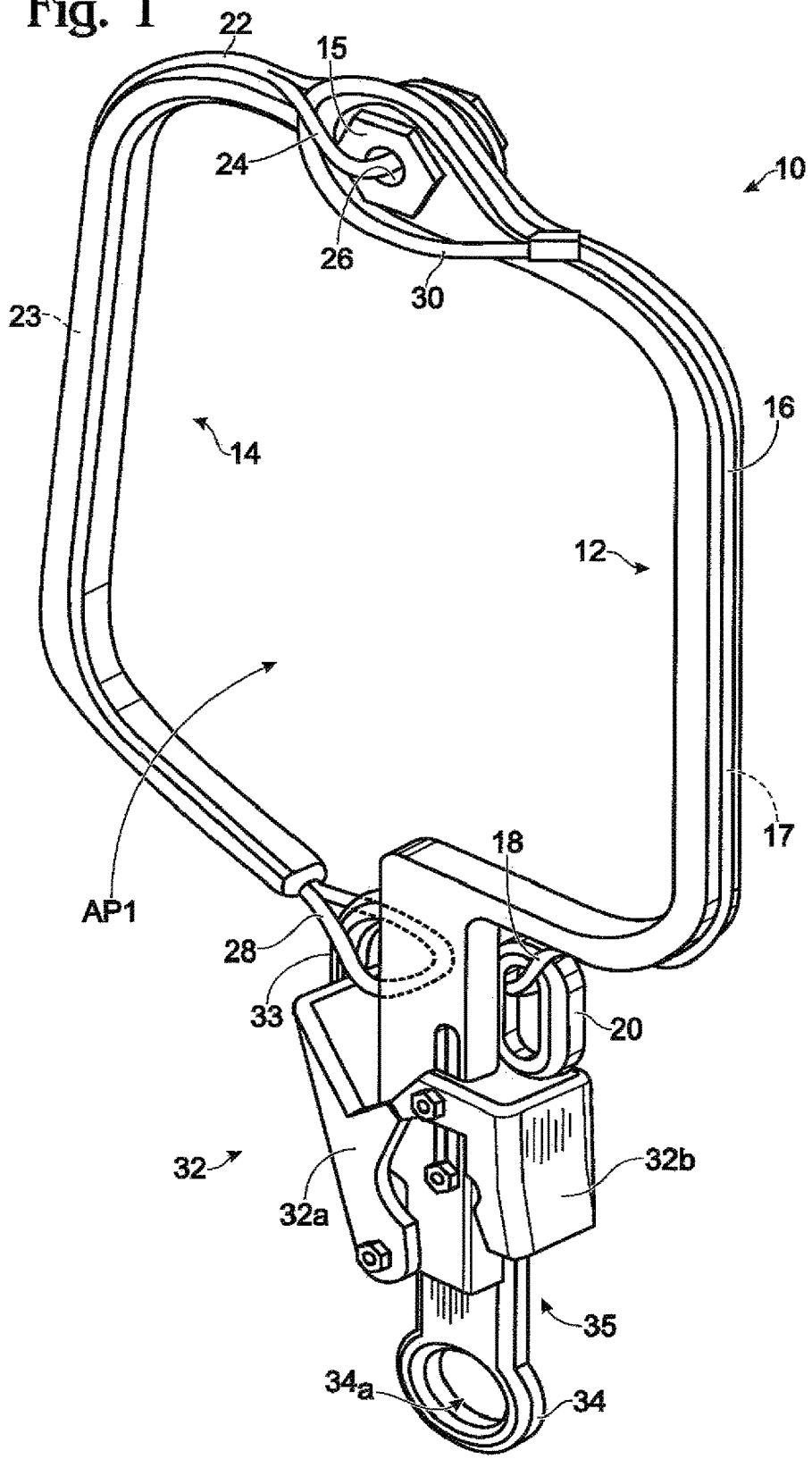
FIG. 1 is a perspective view of an example connecting and anchoring device.
Figure 11:
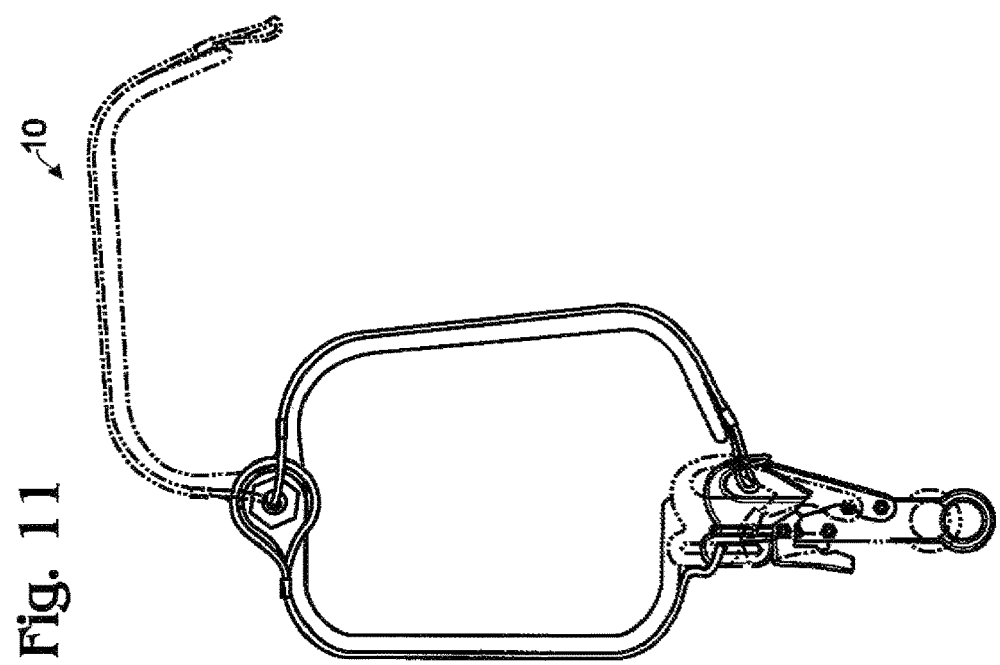
Figure 12:
Figure 10:
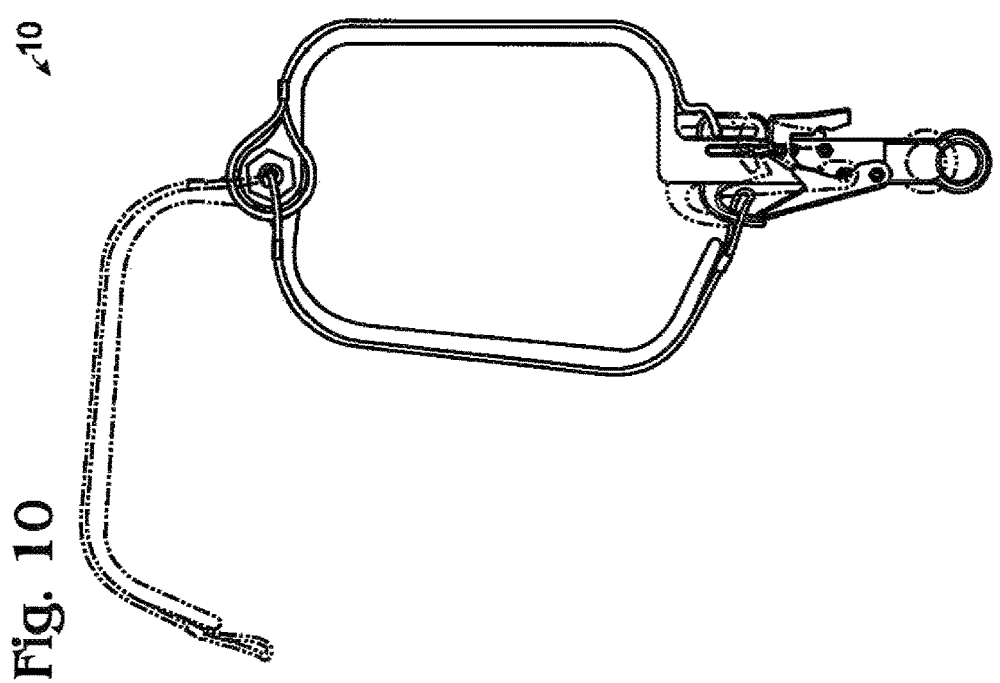

A connecting and anchoring device is disclosed herein as it may be implemented as fall protection equipment, e.g., in various work practices including but not limited to working at height, tower and antenna climbing, work positioning, rope access, confined space entry, rescue, and other practices involving connecting and anchoring equipment. The connecting and anchoring device can be made to be lightweight.

In an example, the connecting and anchoring device has a non-rated shape to hold a rated piece of material. Also in an example, the connecting and anchoring device has an outward opening gate function which enables the connecting and anchoring device to fit over large anchors.

Before continuing, it is noted that as used herein, the terms "includes" and "including" mean, but are not limited to, "includes" or "including" and "includes at least" or "including at least." The term "based on" means "based on" and "based at least in part on."

With reference to FIGS. 1-4, in an example, the connecting and anchoring device 10 includes a first arm 12 and a second arm 14. The second arm 14 is hinged at a hinge 15 to the first arm 12 so that the second arm 14 can swing open. A first cable 16 is provided in a channel 17 formed in the first arm 12 and is connected by a loop 18 at a first end of the cable 16 to an attachment 20. A second cable 22 is provided in a channel 23 formed in the second arm 14 and is connected by a loop 24 at a first end of the cable 22 to an opening 26 formed in the hinge 15. The second cable 22 is connected by a loop 28 at a second end of the cable 22 to an attachment 31. The first cable 16 is connected to the second cable by interconnecting a loop 30 at a second end of the cable 16 to the loop 24 of the cable 22.

The connecting and anchoring device 10 may also include a double action snap hook 32. An attachment 34 having an opening 34a is provided to connect to a line (e.g., a rope) or other connection.

An example connecting and anchoring device 10 is manufactured of an aluminum shape that has a groove in it. The first and second cable is a wire rope. Other suitable materials may also be provided, including but not limited to plastic, titanium, copper, brass, synthetic materials, rope or cord made of various materials, and additional materials such as Spectra or Dyneema high modulus polyethylene type materials.

The combination of rated and non-rated materials connects together using a small snap hook style connecting device that conforms to ANSI standards. In some cases, the connecting and anchoring device also removes the need for a traditional sling and connector setup to create an anchor which is a two handed operation.

The terms "rated, "unrated" and "non-rated" are used herein to refer to materials for fall protection. Rated refers to a product's ability to hold 5,000 lbs static load and means the material is considered trustworthy and strong enough to save a person's life. Unrated or non-rated means that the material is weak and not trustworthy.

The example connecting and anchoring device 10 may be attached to various types of lanyards to anchors, e.g., in fall protection and rescue systems. In an example operation, the connecting and anchoring device 10 may be attached to a lanyard or other piece of material (e.g., sewn into the lanyard) during the production phase or by a rated connector to retro fit an existing lanyard. In another example operation, the connecting and anchoring device 10 may connect a shock absorbing lanyard or retractable device from a climber's harness to an anchor point. Other operations are also contemplated, such as but not limited to rope access for rock climbing or structure climbing.

Before continuing, it should be noted that the examples described above are provided for purposes of illustration, and are not intended to be limiting. Other devices and/or device configurations may be utilized to carry out the operations described herein.

FIGS. 9-12 illustrate operation of an example connecting and anchoring device. In an example, the connecting and anchoring device is operated by a single handed operation. The climber squeezes the small double action snap hook, then slides the hood upwards to disconnect the structural termination. The large non-rated shape holding rated material then hinges open and can be placed over an anchor point. The climber can ensure that the eye of the rated material connects successfully into the small snap hook.

It is noted that the climber may use different methods to operate the hook. Examples include, but are not limited to, gravity or by using the hook against the structure to ensure opening and closing functions.

Once assembled, the climber can ascend, descend, and otherwise transition the structure, e.g., to perform a job function.

In another example, two of the connecting and anchoring devices may be provided in conjunction with one another, e.g., each on separate lanyard legs. This example enables the climber to transition the structure while maintaining continuous fall protection.

The operations shown and described herein are provided to illustrate example implementations. It is noted that the operations are not limited to the ordering shown. Still other operations may be implemented.

It is also noted that the examples shown and described above are provided for purposes of illustration and are not intended to be limiting. Still other examples are also contemplated.

It may be noted that, in the embodiment 10 of a connecting and anchoring device, the dimension "A" in FIG. 2 may be 1.25 inches; the dimension "B" in FIG. 7 may be 8.05 inches; the dimension "C" in FIG. 8 may be 8.27 inches; the dimension "D" in FIG. 8 may be 2.25 inches; the dimension "E" in FIG. 8 may be 3.59 inches; the dimension "F" in FIG. 8 may be 1.13 inches; the dimension "G" in FIG. 9 may be 11.87 inches; the dimension "H" in FIG. 9 may be 10.00 inches; the dimension "J" in FIG. 9 may be 0.67 inch; and the dimension "K" in FIG. 9 may be 1.00 inch.

Referring to FIGS. 1 and 3, for reference purposes further below, the arms 12 and 14 define a connecting aperture "AP1" of the device 10; the device has a base element 35 and a fixed hook 33; the double action snap hook 32 has a hook portion 32a and a latching portion 32b; the hook portion 32a of the snap hook 32, in combination with the fixed hook 33, defines a void aperture 36; and the loop 28 of the cable 22 defines an aperture 28a therethrough.

A preferred embodiment 100 of a connecting and anchoring device according to the invention is shown in FIG. 13. The device 100 has a tubular spine 102, a gate 104, a latch 106, and a base 108. Also as indicated in FIG. 13, the spine 102 has a gate directed terminal end 102a.

The device 100 defines a connecting aperture "AP2" for surrounding, and thereby providing for connecting to, a structural part (not shown) such as a length of angle iron on a cellular tower. The device 100 is shown in FIG. 13 in a configuration in which the connecting aperture is "closed," meaning for purposes herein that the aperture is contiguously surrounded (360 degrees) by structure, so that a ring (which by this same definition also has a closed aperture) encircling any portion of the structure and passing through the aperture could not be removed from the aperture without changing the configuration of the device.

In contrast with the closed configuration, the device may be placed in an "open" configuration in which the ring can be removed from the connecting aperture AP2 through an opening "O" obtained by pivoting the gate 104 from the position shown in FIG. 13 to the position shown in FIG. 14 as will be described further below.

FIG. 16 shows the cross-section of the device 100 indicated in FIG. 15, revealing two cables; a spine cable 110 housed within the spine 102, and a gate cable 112 housed within the gate 104.

One end of the spine cable 110 terminates at a ball-shaped spine cable termination structure 114, and the opposite end of the spine cable terminates at a spine base termination structure 116.

Likewise, one end of the gate cable 112 terminates at a ball-capturing-shaped gate cable termination structure 118, and the opposite end of the gate cable terminates at a gate base termination structure 120.

The spine base termination structure 116 and the gate base termination structure 120 are pivotally attached to each other at a pivot joint "$J_1$" by a pin "$P_1$," to allow for the action described further below.

It is, however, not essential that a pivot joint such as the pivot joint $J_1$ be provided because the cables are flexible. For example, a single cable could be used in place of the two cables 110 and 112, at respective opposite ends of which would be the ball-shaped spine cable termination structure 114 and the ball-capturing-shaped gate cable termination structure 118. An embodiment having a "single cable" feature is disclosed further below. But it is generally preferred to provide separate cables to the pivot joint $J_1$, to avoid causing fatigue in the cable element due to repeated bending of the cable element at the pivot joint. So in embodiments where a cable element extends uninterrupted through a pivot joint at a particular location, care should be taken to reduce or minimize the potential for cable fatigue due to bending at that location.

The terminated ends of the cables are typically attached to the termination structures by swaging, but other attachment methodologies or means could be employed.

As can also be seen in FIG. 16, the ball-capturing-shaped gate cable termination structure 118 has a ball-shaped void "V" adapted or configured to receive the ball-shaped spine cable termination structure 114 so as to retain the ball-shaped spine cable termination structure therein or thereby against forces, directed axially along an axis of closure "AC" (FIG. 13) of the device 100, tending to pull the gate directed terminal end 102a of the spine away from the gate 104. The joint "J$_2$" formed by the connection between the ball-shaped spine cable termination structure 114 and the ball-capturing-shaped gate cable termination structure 118 is preferably able to withstand at least 1,800 pounds of static tensile load without breaking to accord with ANSI standards for fall protection devices, and preferably at least 5,000 pounds.

As will be readily appreciated, the spine and gate cable termination structures 114 and 118 could be reversed, and other complementary mating shapes or structures could be used that would serve the same purpose.

Also with reference to FIG. 16, the pin P$_1$ may be attached to the base 108, and the spine 102 has a base directed terminal end 102b which may be attached to the base as well.

Figure 17:
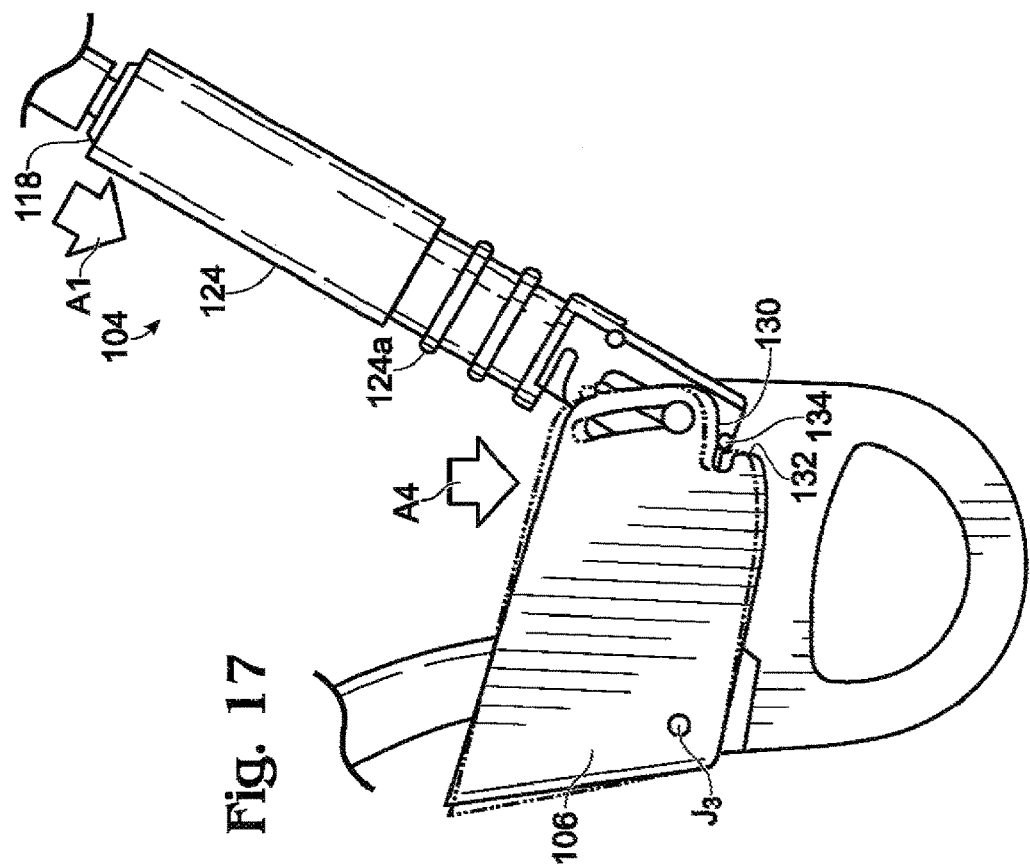
FIG. 17 is a close-up view of a portion of the connecting and anchoring device of FIGS. 13 and 14 from detail 17 in FIG. 13, showing a latch, gate, and cover portion in first positions with the connecting and anchoring device being fully closed.
Figure 19:
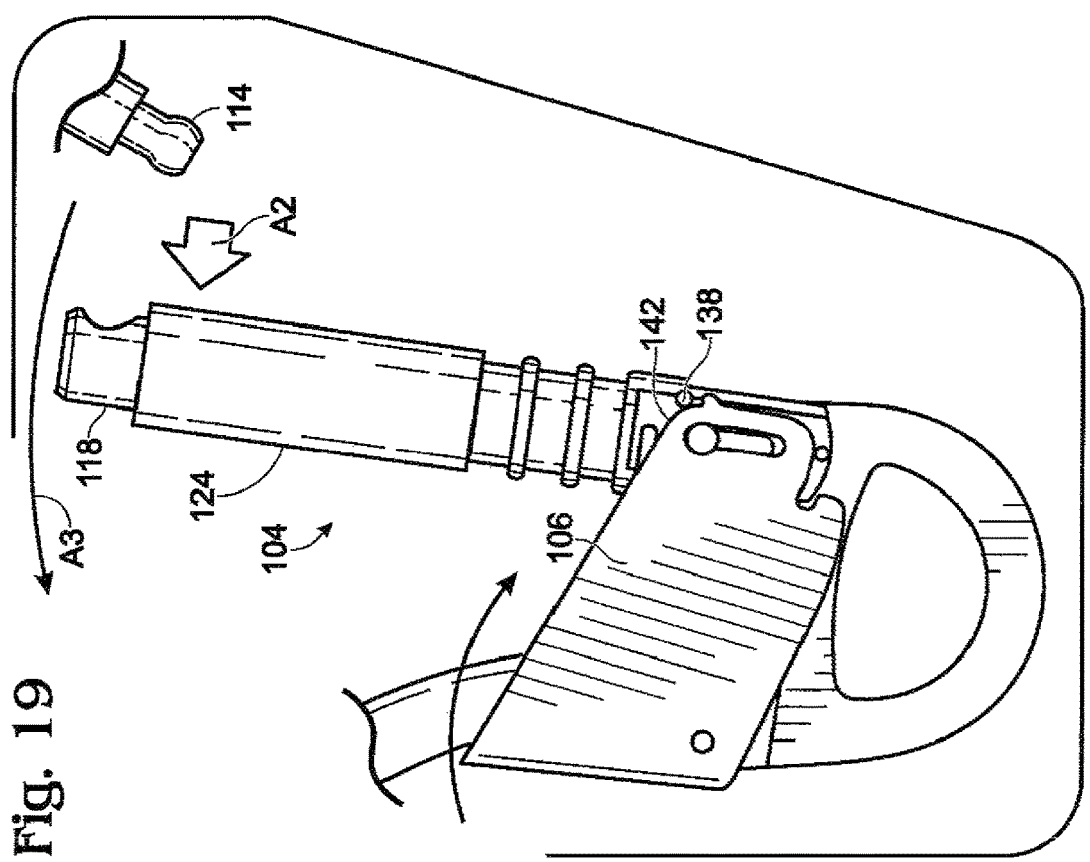
FIG. 19 provides the same view as FIG. 18, except that the gate has been moved to a second position so that the connecting and anchoring device is partially open.
Figure 18:
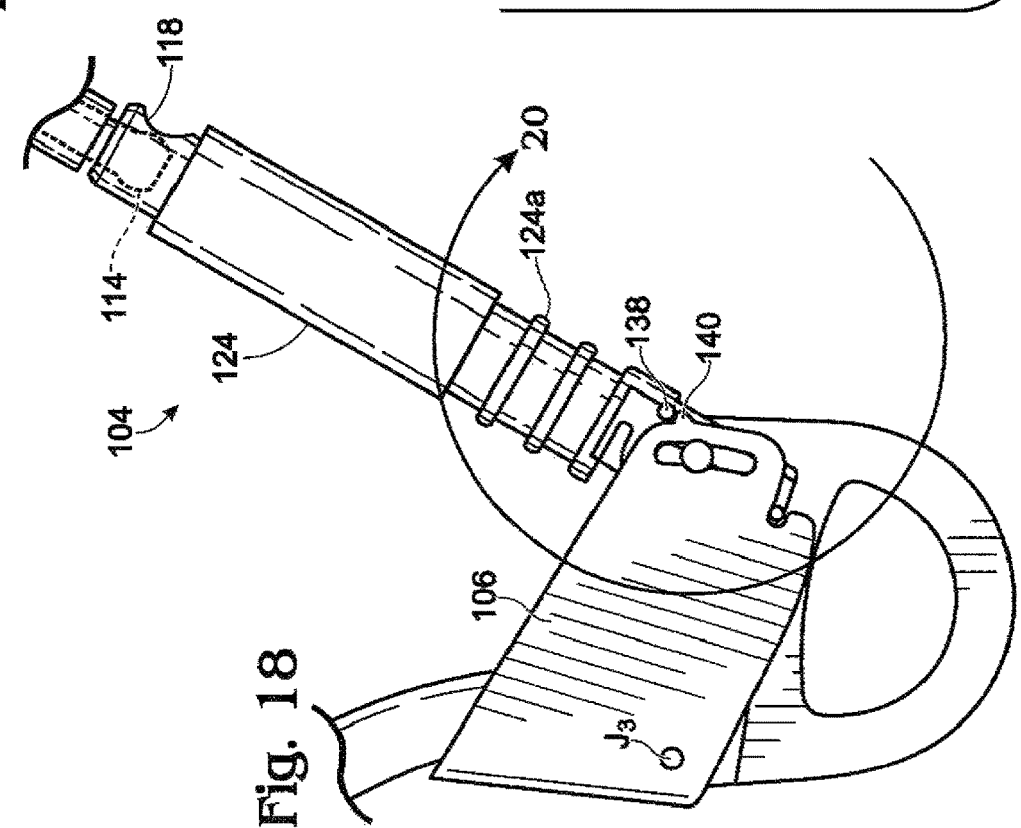
FIG. 18 provides the same view as FIG. 17 except that the latch and cover portion have been moved to second positions.

Referring again to FIG. 13, the gate 102 has a manipulable locking element or, more specifically in this embodiment, a "cover portion" 124 that covers the ball-shaped spine cable termination structure 114 and the ball-capturing-shaped gate cable termination structure 118 sufficient to capture the ball-shaped spine cable termination structure 114 within the ball-shaped void of the ball-capturing-shaped gate cable termination structure 118 when the device 100 is in the closed configuration shown in FIGS. 13 and 16. One or more projecting ribs 124a may be provided on the cover portion 124 to assist a user of the device to manipulate the cover portion with a finger so as to force the cover portion to slide toward the base 108 against the bias of a spring 122 (FIG. 16). This action is indicated by comparison of FIGS. 17 and 18. Assuming an appropriate manipulation of the latch 106 as will be described further below, manipulating the cover portion 124 of the gate 104 as shown in FIG. 17 so as to retract it in the direction of the arrow "A1" results in the cover portion being placed in a retracted position that uncovers the ball-shaped spine cable termination structure 114 and the ball-capturing-shaped gate cable termination structure 118 as shown in FIG. 18, sufficient to allow for releasing the latter from the former by pivoting the gate 104 (about the hinge joint J$_1$ in FIG. 16) in the direction of the arrow "A2" as shown in FIG. 19, and thereby placing the device 100 in the open configuration shown in FIG. 14.

As noted, the latch 106 must be appropriately manipulated to allow for opening the device. This is a safety feature.

Figure 20:
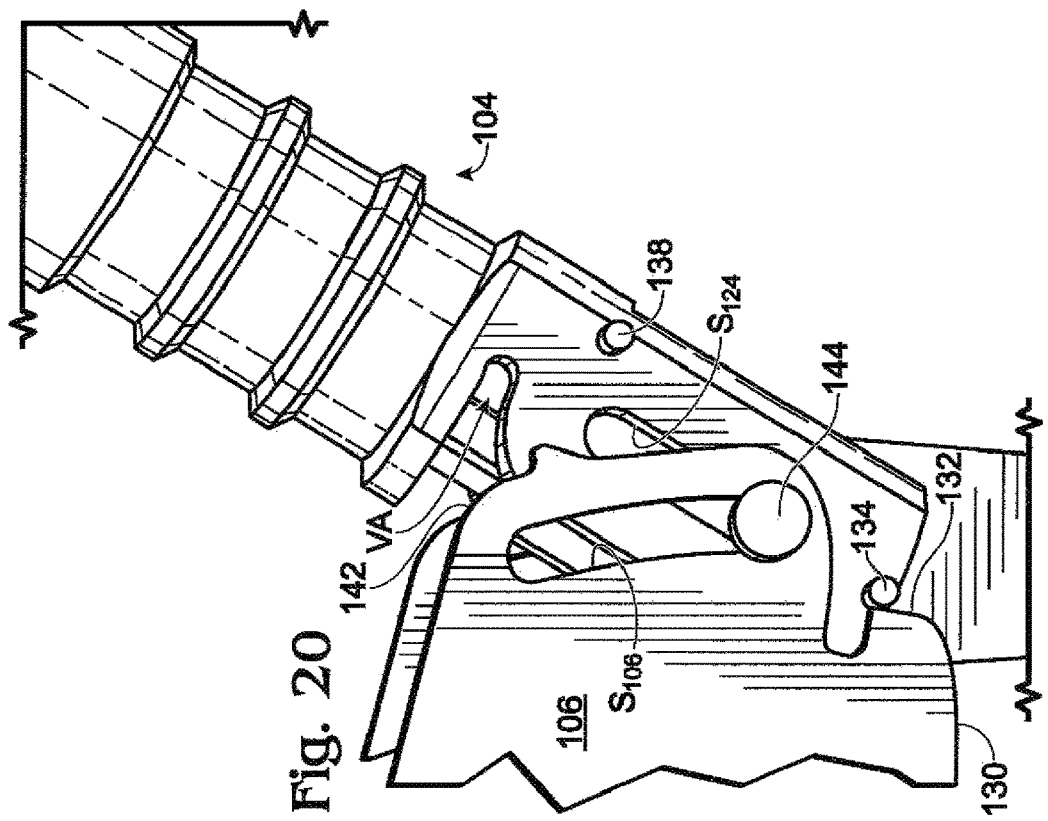
FIG. 20 is a close-up view of a portion of the connecting and anchoring device of FIGS. 13 and 14 from detail 20 in FIG. 18.

Referring again to FIGS. 13 and 16, the latch 106 is pivotally connected to the base 108 at a pivot joint "J$_3$." Also, as best seen in FIG. 20, the latch has sliding edge 130 and a binding edge 132, and the gate 104 has a binding pin 134 for interacting with the binding edge 132.

Referring again to FIG. 17, in the closed position of the device 100 the latch 106 is in the position shown in phantom lines. As can be appreciated by inspection, the bind pin 134 of the gate 104 will bind on the binding edge 132 of the latch 106 if a user of the device attempts to slide the cover 124 in the direction of the arrow A1, preventing the movement and thereby maintaining the device in the closed configuration.

To allow for opening the device 100, the user must manipulate the latch 106 so as to pivot it about the pivot joint J$_3$, such as by depressing it in the direction of the arrow "A4." A slight amount of movement in response to such depression is indicated in FIG. 17, with the latch resulting in the position shown in solid lines. The binding pin 134 is now sufficiently free of the binding edge 132 to allow the sliding edge 130 to come into contact with the binding pin 134. Thus further depression of the latch 106 in the direction of the arrow A4 assists in moving the cover 124 in the direction of the arrow A1, as needed to open the device as described above.

As will be readily appreciated by persons of ordinary skill, an equivalent latching feature could be provided by a latching mechanism adapted for linear, rather than pivotal or rotational travel, or a combination of the two.

Also it should be noted that there are a number of connecting and anchoring devices that are known in the prior art which utilize gates and latches having various configurations and methods of operation, and any of these may be utilized in connecting and anchoring devices according to the present invention.

FIG. 18 shows a completion of the action described above sufficient to release the ball-capturing-shaped gate cable termination structure 118 from the ball-shaped spine cable termination structure 114, and allow for pivoting the gate 104 as shown in FIG. 19 and thereby opening the device.

Figure 14:
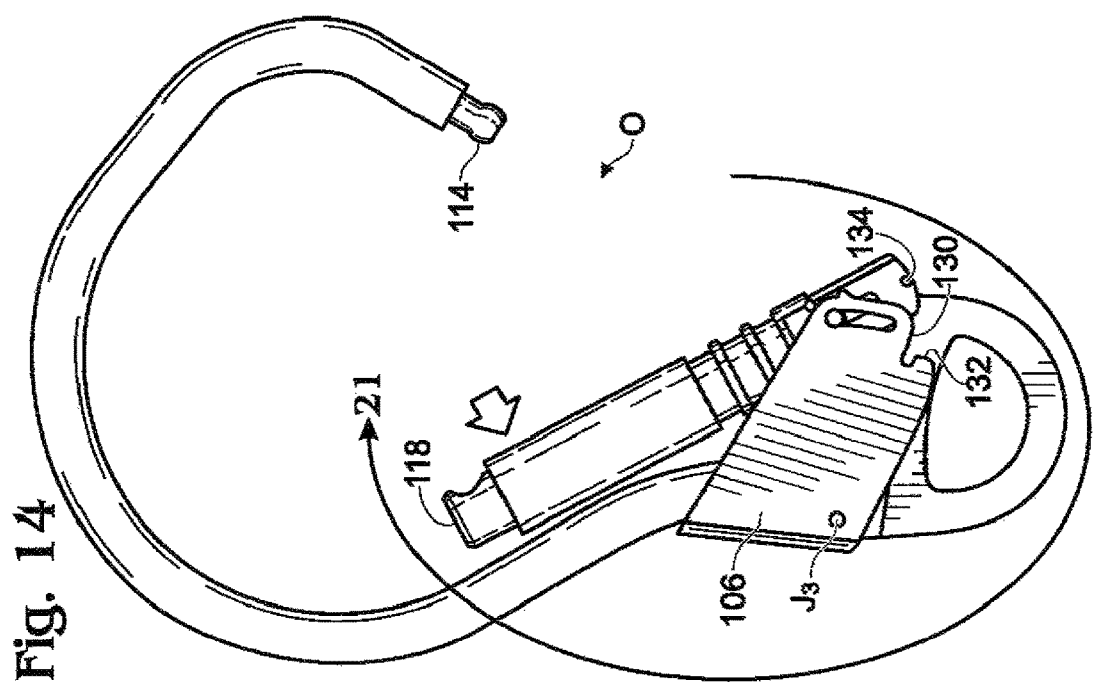
FIG. 14 is a plan view of the connecting and anchoring device of FIG. 13, shown in an open configuration.
Figure 21:
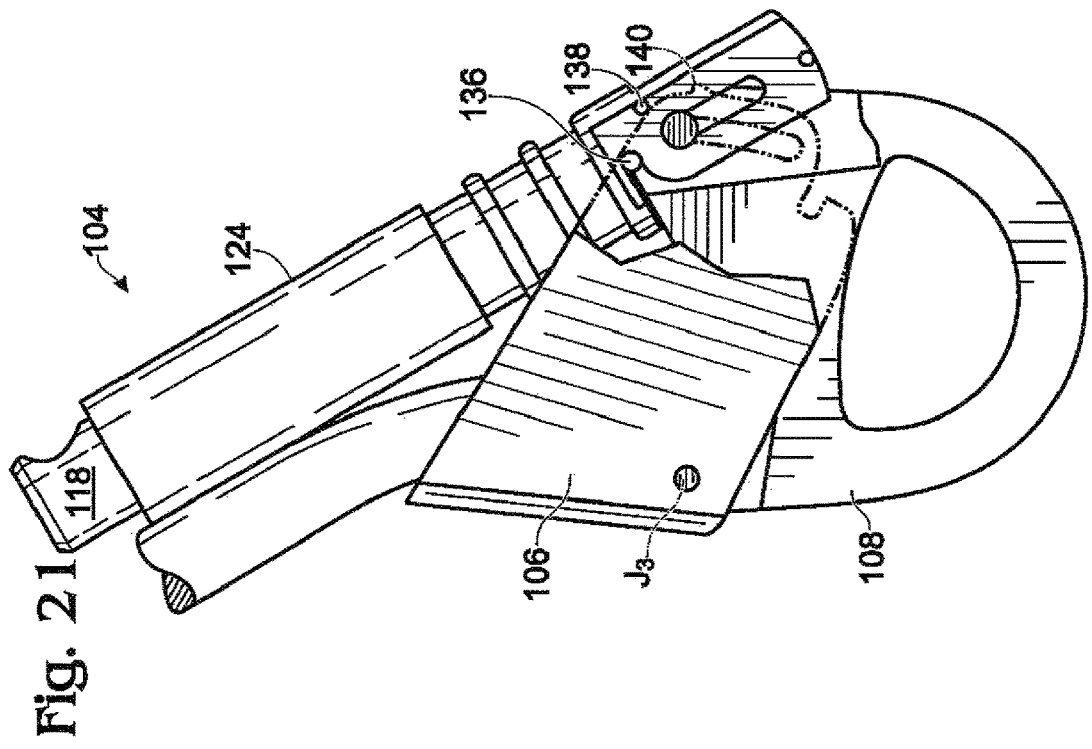
FIG. 21 provides the same view as FIG. 19, except that the gate has been moved to a third position so that the connecting and anchoring device is fully open.

FIG. 21 shows the gate 104 after it has been pivoted from the position shown in FIG. 19, and pivoted farther in the direction of the arrow "A3," reaching the position shown in FIG. 14 where the device 100 is fully open. A void area "VA" in the gate 104, best seen in FIG. 20, closes on a stop pin 136.

The stop pin 136 may be attached to the spine base termination structure 116 as shown in FIGS. 16 and 22, or to the base 108 as shown in FIG. 23, where the stop pin is referred to as "136A." The stop pin 136 or 136A both stops further rotation of the gate 104 beyond that shown in FIGS. 14 and 21, and retains the cover portion 124 in the retracted position.

Referring back to FIG. 18, a cover pin 138 of the cover portion 124 engages a tang 140 of the latch 106 when the cover portion is fully retracted to uncover the ball-shaped spine cable termination structure 114 and the ball-capturing-shaped gate cable termination structure 118 as shown in FIG. 18 and described above. The tang 140 ensures that retraction of the cover portion 124 is accompanied by an appropriate amount of rotation of the latch 106 about the pivot joint J$_3$.

With reference to FIGS. 19 and 21, the cover pin 138 rides across an arcuate latch control surface 142 of the latch 106 as the gate 104 is pivoted in the direction of the arrow A3 in FIG. 19, which maintains the latch in its depressed condition.

As best seen in FIG. 20, a guide pin "GP" attached to the base 108 provides for constraining, by tying together, movements of the latch 106 and cover portion 124 of the gate 104 within respective arcuate elongate slots "S$_{106}$" of the latch and "S$_{124}$" of the cover portion.

It may be noted in connection with FIG. 13 that, in the embodiment 100, the dimension "L" is preferably in the range 4-6 inches, and most preferably is between about 5.4-5.8 inches; the dimension "M," which is the maximum diameter of the connecting aperture AP2, is preferably in the range 8-11 inches, and most preferably is between about 9.1-9.5 inches; the dimension "N," which is the maximum diameter of the connecting aperture AP2 perpendicular to the dimension M, is preferably in the range 7-9 inches, and most preferably is between about 6.7-7.1 inches; and the diameter of the largest inscribed circle "IC" within the connecting aperture AP2 is preferably at least about 6 inches, and more preferably at least about 6.4 inches.

It may be further noted in connection with FIG. 16 that, in the embodiment 100, the dimension "Q" is preferably sufficient to provide for a pass-through clearance of no less than about 3 and ¼ inches between the gate 104 and the ball-shaped spine cable termination structure 114.

All of the foregoing dimensions are to adapt the device 100 for connecting to a piece of nominal 4 inch angle iron and, as will be readily appreciated, one or more of them may be subject to change if the device is to be adapted or configured for connecting to structures having different shapes or sizes. That is, the dimensions are intended to be scalable. However, the dimension "P" has a theoretical limit of 6 feet, which is the maximum allowable fall distance, and as a practical matter P is preferably no more than about 3 feet because there will in use be at least one additional connector, for connecting the connecting and anchoring device to a harness worn by the user. It will also be appreciated that limitations on the maximum size of the dimension P imply limitations on the maximum sizes of other dimensions as well.

Figure 24:
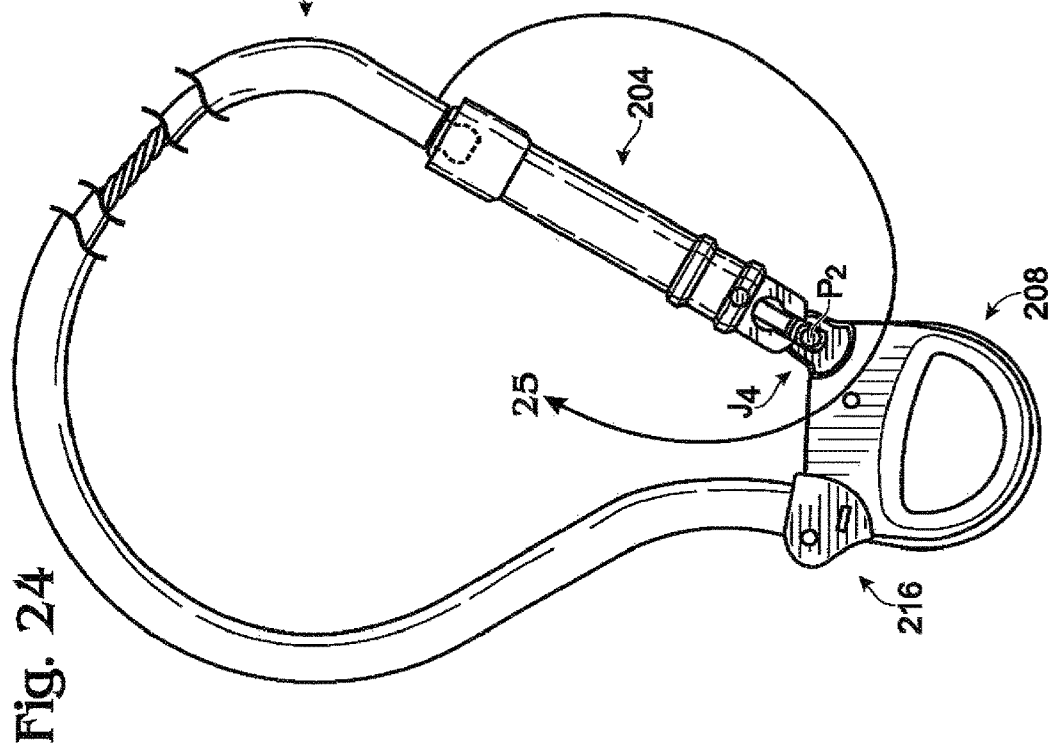
FIG. 24 is a plan view of a third embodiment of a connecting and anchoring device according to the present invention, shown in a closed configuration.

FIG. 24 shows a connecting and anchoring device 200 according to the present invention. The device 200 has a base 208 corresponding to the base 108 of the device 100; a spine 202 corresponding to the spine 201 of the device 100; a spine cable 210 corresponding to the spine cable 110 of the device 100; a gate 204 corresponding to the gate 104 of the device 100; a cover portion 224 corresponding to the cover portion 124 of the device 100 and having projecting ribs 224a corresponding to the projecting ribs 124a of the device 100; and with additional reference to FIG. 25, the device 200 has a gate cable 212 corresponding to the gate cable 112 of the device 100.

The device 200 also has a spine base termination structure 216 corresponding to the spine base termination structure 116 of the device 100. Whereas in the device 100 it is both convenient and preferable for the fatigue avoiding reason noted above, to provide a pivotal mounting for the spine base termination structure along with the pivotal mounting of the gate base termination structure at the pivot joint $J_1$ (FIG. 16). But it is not essential, and this feature is omitted in the embodiment 200 as shown.

Figure 25:
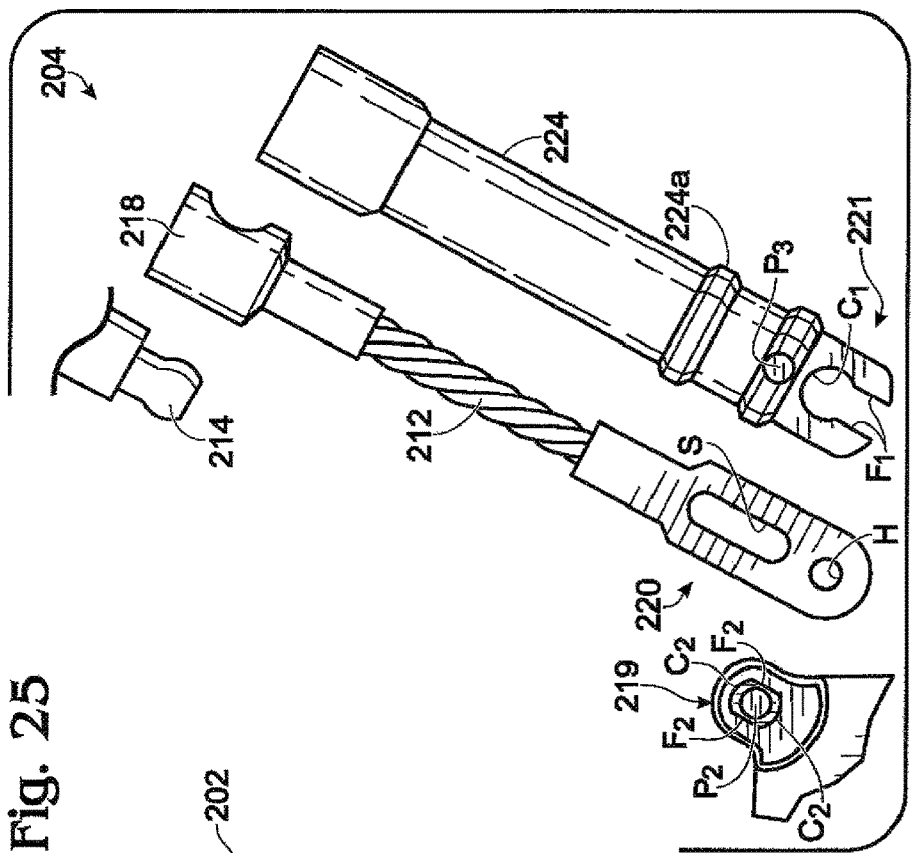
FIG. 25 is a fragmentary exploded elevation view of a gate portion of the third embodiment from detail 25 in FIG. 24.

With reference to FIG. 25, the gate cable 212 has a gate base termination structure 220 corresponding to the gate base termination structure 120 of the device 100, where the pin "$P_2$" corresponds to the pin $P_1$ of the device 100. The gate base termination structure 220 has a hole "H" for receiving the pin $P_2$, defining a pivot joint "$J_4$" corresponding to the pivot joint $J_1$ of the device 100.

The cover portion 224 has a key structure 221 having a pair of opposed, parallel flat faces "$F_1$." In cooperation, the pin $P_2$ is provided with, or is provided in conjunction with, a guide element 219 having a corresponding pair of opposed, parallel flat faces "$F_2$."

Figure 26:
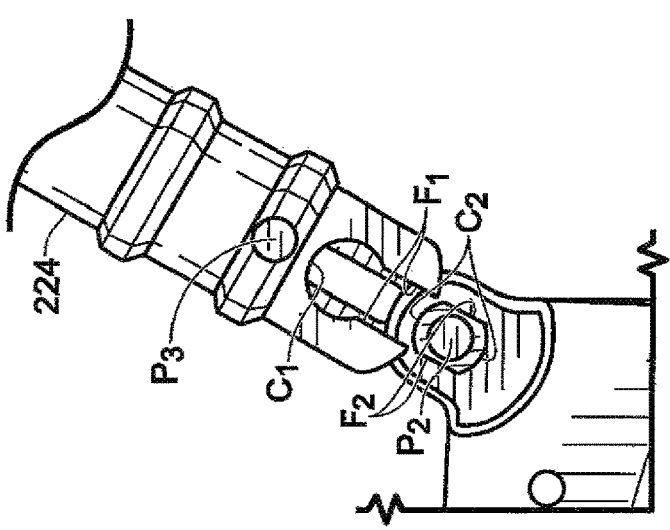

With reference to FIG. 26, as the cover portion 224 is manually moved in the direction of the arrow "A6" toward a retracted position of the cover portion 224, to allow for opening the gate 204, the faces $F_1$ of the guide element 219 receive the faces $F_2$ of the key structure 221, preventing rotation of the gate 204 about the base 208.

Figure 27:
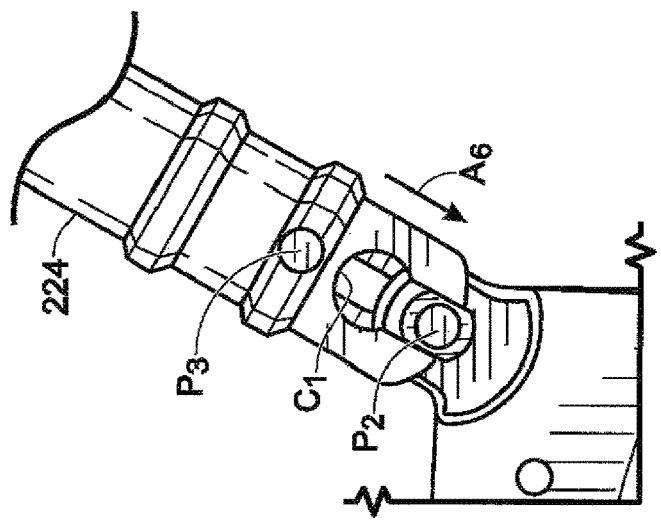

Referring back to FIG. 25, the key structure 221 has a circular face "$C_1$," and the guide element 219 has a corresponding pair of opposed, circular faces "$C_2$" that are portions of a shared circular arc having a diameter that is just slightly smaller than that of the face $C_1$, so that the face $C_1$ can be concentrically and pivotally disposed about the faces $C_2$. This allows for rotating the gate 204 as indicated by the arrow "A7" in FIG. 28 after the cover portion 224 has been moved far enough in the direction of the arrow A6 of FIG. 27 to achieve a retracted position, in which the faces $F_1$ of the key structure 221 have cleared the faces $F_2$ of the guide element 219 and the circular face $C_1$ of the key structure has become seated on the circular faces $C_2$ of the guide element.

Figure 28:
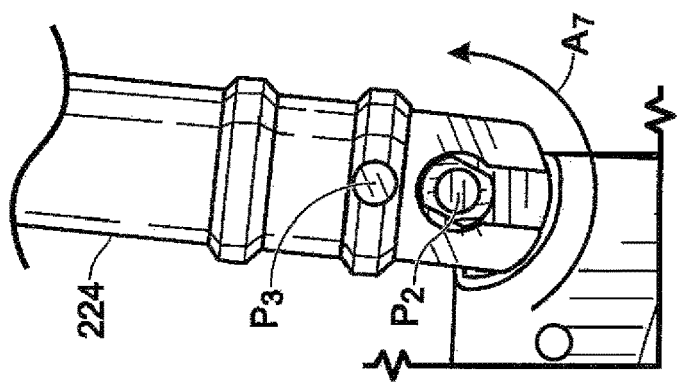
FIGS. 26-28 are close-up views of the components of FIG. 25 together, showing a sequence of operation thereof.

As can be appreciated by inspection of FIG. 28, once the gate 204 has been pivoted so as to engage the circular faces of the key structure and guide element, the cover portion 224 is retained in the retracted position.

Also referring to FIG. 25, the gate base termination structure 220 has an elongate slot "S," and the cover portion 224 has a pin "$P_3$" that fits in the slot S, the slot and pin retaining the cover portion so that it cannot be pulled away from the gate 204 in the direction opposite the arrow A6 once the gate is opened, and maintaining contact between the faces $F_1$ and $F_2$ so they don't have to find one another other before the cover portion 224 can be retracted in the direction of the arrow A6.

FIGS. 29-32 show an example of an additional set of complementary mating shapes or structures for releasably connecting the gate 104 (or 204) to the spine 102 (or 202). Here the spine 102 (or 202) is replaced with a spine A02 having, in this example, a rib A24b, and the gate 104 (or 204) is replaced with a gate A04 having, in this example, a horse-shoe shaped cavity A20 for semi-circularly surrounding (in and/or out of the plane of the Figure) the rib A24b. Again, other complementary mating shapes or structures could be used.

The term "manipulable" means manipulable by hand.

The term "housing" used as a noun refers to any structure that houses a cable, and includes open structures such as the arms 12 and 14 of the device 10 and closed structures such as the spine 102 and gate 104. For example, a spine housing of the spine 102, used for housing the spine cable 110 is referenced as 102H in FIG. 16, and in the embodiment shown is tubular.

A "cable" for purposes herein is a flexible elongate member. The term "cable" has a standard definition referring to a rope of twisted fibers or strands. In such examples, preferably, the fibers are metal, and more preferably they are stainless or galvanized steel. But in general, for purposes herein, a "cable" can be any elongate member that will satisfy the load requirements and provide the functionality described herein. Such an elongate member should be able to substantially immediately (e.g., within 0.1 seconds) bend, away from its elongate axis, with relatively little resistance in response to an applied bending load (e.g., 1000 pounds), and thereby substantially immediately convert the bending load into a tensile load which the member can sustain.

For purposes of definition herein, an elongate member is "flexible" if it has a flexural rigidity, or resistance to a force causing the member to bend, that is preferably at least 10 times less, and more preferably at least 100 times less, than the resistance of the member to a force causing the member to yield in tension.

Accordingly, as in the example connecting and anchoring device 100 described above where the first and second cables are identified as being wire ropes it was noted, as would be readily appreciated by persons of ordinary skill in the art, that there are many possible forms a flexible elongate member can take that are equivalents to wire ropes, both in terms of the materials that can be used and the configurations in which those materials can be provided. Examples of such alternative materials have been noted above and include, without limitation, composite materials and non-metallic materials such as natural or man-made polymeric materials. Examples of such alternative configurations include, without limitation, non-woven configurations such as molded, extruded, or other integrally formed configurations.

So herein it will be understood that a cable is a flexible elongate member and may have any of the characteristics, including any of the materials and configurations, thereof.

It may also be noted that cables according to the invention are not necessarily required to sustain a 5,000 static load without breaking to meet the applicable fall arrest protection standards. The breaking strength that is truly needed for a given fall arrest event depends on the energy absorption properties of the connecting and anchoring device as a whole, including its cables, and that of any energy absorbing devices that are attached to the connecting and anchoring device, as a consequence of deformation. Therefore, the cables and the termination structures that tie them together to form closed loops as described herein, can have a breaking strength that is as little as 900 pounds depending on the application.

Housings according to the invention may be formed of metal, plastic, or composite materials, and are preferably formed of aluminum. The purpose of the housing or housings used for the cable or cables is to impose upon the cable or cables a convenient overall shape, such as the key-hole shape enclosing the inscribed circle IC as seen in FIG. 13, to facilitate ease of use of the device.

It is intended that the cable or cables alone will provide for satisfying the maximum load bearing requirement of the device. This provides that the housing or housings for the cable or cables need not provide structural support at maximum loading, because they may have, and in preferred embodiments are intended to have, either yielded or broken in response to the load.

Housings for a connecting and anchoring device according to the invention are preferably at least twice, more preferably at least five times, and still more preferably at least ten times, as flexurally rigid as cables (which as a general rule would have an almost insignificant amount of flexural rigidity) for the device, but they may be considerably weaker in tension, as measured in a standard tensile test. As one example, they may be no more than 75% as strong, so that if the cable or cables can sustain a 5,000 pound load without breaking, the housing or housings may only be capable of sustaining a 3750 pound load without breaking. The intentional provision of relatively weak housings as compared to cables provides advantages of allowing for economizing on the housing material, and design flexibility in its configuration.

It may be noted in this regard that the additional set of complementary mating shapes or structures described above in connection with FIGS. 29-32 connects the gate to the relatively rigid spine housing when the device is closed, and thereby provides additional rigidity to the device. While it is generally desirable for the housing or housings to be relatively weak compared to the cable or cables, and therefore be incapable of supporting by themselves the load required to protect a user from a fall, it is desirable that the housing or housings provide enough strength so that the device will maintain its integrity during everyday use where the user is not falling. For example, a worker using the device to climb a power-line tower to repair the power-line would be expected to pull on or lean on the device during the course of performing that work, and it is desirable to ensure that such ordinary use will not cause permanent yielding or breaking of the housing or housings. Providing an additional set of complementary mating shapes or structures such as those just described assists in achieving that objective, and thus reduces further the strength requirements of the housing or housings.

It may also be noted that in connecting and anchoring devices according to the invention where the dimension P in FIG. 13 is about 12 inches or less, it may be desirable to provide that the housing or housings be strong enough so that the housing or housings and the cable or cables share the load required to protect the user from a fall, if there is not sufficient space to provide a cable or cables that have the capacity to satisfy that requirement alone.

Staying with FIG. 16, where the spine housing 102H is formed of metal material(s) and does break, it may produce sharp edges at the point of breakage that would pose a risk of damage to the spine cable 110. To address this problem the spine cable is preferably sheathed in a protective tube 111 which is preferably formed of a relatively flexible material, such as a polymer material, to protect the cable 110 from being torn or weakened as a result of coming into contact with any such sharp edges in the event of any such breakage.

A similar potential exists in the device 10, and so it is desirable to provide a protective tube for the cables 16 and 22 thereof, as well.

More particularly, it is desirable to provide a protective tube for at least portions of the one or more cables used in the connecting and anchoring device, that otherwise would or could come into intimate contact with a corresponding one or more housings of the device, that has a breaking strain (maximum elongation of a test portion of the tube at the point of breaking when the test portion is subjected to a tensile stress along its elongate axis) that is at least twice as great as (and is thereby "substantially" greater), and preferably at least five times as great as, the breaking strain of the corresponding one or more housings, and which is therefore capable of undergoing substantially greater plastic deformation than the cables or portions thereof.

It is also preferable to provide that the flexural rigidity of protective tubing for the device is less than or equal to that of the portion(s) of the cable or cables the tubing sheaths.

A protective tube for sheathing one or more of the one or more cables of a connecting and anchoring device, such as the tube 111, may also be used to electrically insulate metal(s) of which the one or more cables is formed from metal(s) of which the one or more housings is formed, and thereby provide the advantage, in cases where these metals are different, of preventing them from creating a galvanic cell in which one of them will cause another of them to corrode in the presence of an electrolyte.

A similar consideration applies to the device 10.

More particularly, where one or more housings of a connection and anchoring device and one or more cables of the connecting and anchoring device are formed of one or more metals, a protective tube for sheathing one or more of the one or more cables preferably has an electrical resistivity that is at least ten times greater than the electrical resistivity of the one or more metals (and is thereby "substantially" greater) which, without the protective tube, would or could otherwise come into intimate contact.

Finally, a protective tube, such as the tube 111, may also be used to allow for increasing the outer diameter or dimension of the corresponding housing, such as the housing 102H, so as to put more material farther from the neutral axis of bending of the housing and thereby make the housing stiffer, while decreasing the wall thickness or equivalent dimension of the housing and thereby avoiding the result of increasing its weight. This has the disadvantage of leaving more space in the housing than is desirable for securing the cable, but the protective tube can be used to overcome this disadvantage by filling the extra space with a relatively light-weight material.

Preferably, the material(s) of which the protective tube is formed has less than half the weight per unit volume as (and is thereby "substantially" less dense) the material(s) of which the portion of the one or more housings that would come into contact with the protective tube is formed.

As a brief summary, the material used to form a length of protective tube, as compared to the material used to form a length of cable with which the length of tube is in contact and which the length of tube therefore protects, preferably satisfies at least one, more preferably at least two, and most preferably all of the following conditions: (a) the material as provided is substantially less dense, (b) the material as provided has a substantially greater breaking strain, and (c) the material as provided has substantially greater electrical resistivity.

A protective tube such as the tube 111 is typically provided with solid, i.e. water-tight, walls, but it could be provided in alternative forms, such as a mesh or such as split down the middle, any such alternatives also falling within the meaning of the terms "tube" and "tubing" as used herein. In addition, other structures capable of performing the same or similar functions as tubing could be used, such as tape. Accordingly, the more general term "sheath" is used herein to refer to structures capable of performing the functions and satisfying the physical characteristics described above for a protective tube or tubing, and the terms "sheaths," "sheathed" and "sheathing" refer to providing such structures.

Also, as an alternative to sheathing the cable or cable(s), the housing or housing(s) may be internally coated with a protective material, such as rubber.

For reference, the arm 12 of the embodiment 10 may be considered to correspond to the spine 102 of the embodiment 100; the cable 16 of the embodiment 10 may be considered to correspond to the spine cable 110 of the embodiment 100; the arm 14 of the embodiment 10 may be considered to correspond to the gate 104 of the embodiment 100; the cable 22 of the embodiment 10 may be considered to correspond to the gate cable 112 of the embodiment 100; the hinge 15 of the embodiment 10 may be considered to correspond to the hinge joint $J_1$ of the embodiment 100; the loop 30 of the cable 16 of the embodiment 10 may be considered to correspond to the spine base termination structure 116 of the spine hinge cable 110 of the embodiment 100; and the loop 24 of the cable 22 of the embodiment 10 may be considered to correspond to the gate base termination structure 120 of the gate cable 112 of the embodiment 100.

A "cable termination structure" may be either element of a pair of "complementary mating shapes or structures" such as the ball-shaped spine cable termination structure 114 as paired with the ball-capturing-shaped gate cable termination structure 118 of the embodiment 100, or the loop 28 as paired with the combination of (a) the loop 18, (b) the attachment 20, (c) the hook portion 32a of the snap hook 32, and (d) the fixed hook 33 of the embodiment 10.

For further reference, the loop 28 of the cable 22 may be considered to correspond to the ball-capturing-shaped gate cable termination structure 118 of the gate cable 112 of the embodiment 100; the fixed hook 33 of the embodiment 10 may be considered to correspond to the ball-shaped spine cable termination structure 114 of the embodiment 100; the fixed hook 33 may be considered to correspond to the ball-shaped spine cable termination structure 114 of the embodiment 100; the aperture 28a defined through the loop 28 of the cable 22 in the embodiment 10 may be considered to correspond to the ball-shaped void of the ball-capturing-shaped gate cable termination structure 118. Thus the cable 16 of the embodiment 10 may be considered to correspond to the spine cable 110 of the embodiment 100, with the loop 18 of the cable 16, as looped through the attachment 20, serving to structurally supportively connect (hereinafter "structurally connect," or referring to a "structural connection") the cable 16 to the fixed hook 33 in the embodiment 10.

It may also be noted that the fixed hook 33 and loop 28 of the embodiment 10 provide another example of complementary mating shapes or structures.

In contrast to the direct structural connection between the cable 110 and the ball-shaped spine cable termination structure 114 of the embodiment 100 obtained by swaging the former to the latter, the structural connection between the cable 16 and the fixed hook 33 is indirect, being made through intermediate structures that include the attachment 20.

Likewise, in the embodiment 100, the spine and gate base termination structures 116 and 120 may be structurally connected to the respective cables 110 and 112 through intermediate structures.

In the embodiment 100, the spine and gate base termination structures 116 and 120 are directly structurally connected to each other by the hinge pin $P_1$, but these base termination structures could be structurally connected to each other through intermediate structures.

Likewise, in the embodiment 10, the loops 30 and 24 of the respective cables 16 and 22 are directly structurally connected together with one loop being looped through the other, but these base termination structures could also be structurally connected to each other through intermediate structures.

For still further reference, releasing the loop 28 from the fixed hook 33 after opening the void aperture 36 by pivoting the hook portion 32a of the snap hook 32 relative to the base element 35 in the embodiment 10, thereby allowing for pivoting the arm 14 relative to the arm 12 so as to open the aperture AP1, may be considered to correspond to releasing the ball-capturing-shaped gate cable termination structure 118 from the ball-shaped spine cable termination structure 114 after opening the ball-shaped void of the gate cable termination structure 118 by retracting the cover portion 124 in the embodiment 100 toward the base 108 in the embodiment 100, thereby allowing for pivoting the gate 104 relative to the spine 102 so as to open the aperture AP2.

Also for reference, the latching portion 32b of the snap hook 32 of the embodiment 10 may be considered to correspond to the latch 106 of the embodiment 100. Both of these structures are optional features.

It should be noted that the provision of the above reference examples, of how certain features of the embodiment 10 may be considered to correspond to certain features of the embodiment 100, is intended to be illustrative and not to imply that there are no alternative correspondences that could be identified, or associations that could be made.

The term "chain" for purposes herein means a series of objects structurally connected together, one after the other.

Accordingly for purposes herein, a "chain of cables" includes two or more cables structurally connected together and may include one or more intermediate structures.

For purposes herein, the term "cable element" refers to a single cable or a chain of cables.

Also accordingly for purposes herein, a cable element may terminate in a termination structure either by a direct structural connection or through one or more intermediate structures to which the cable element is structurally connected.

The term "pin" as used herein can be any short piece of metal or other material used for various purposes and therefore need not be pin shaped or "pinned" to the structure from which it depends. For example, a pin can be a tab or stamping that is capable of performing the same functions as the pins described herein.

The terms "adapted" and "configured" as used herein are intended to have the same meaning.

Figure 33:
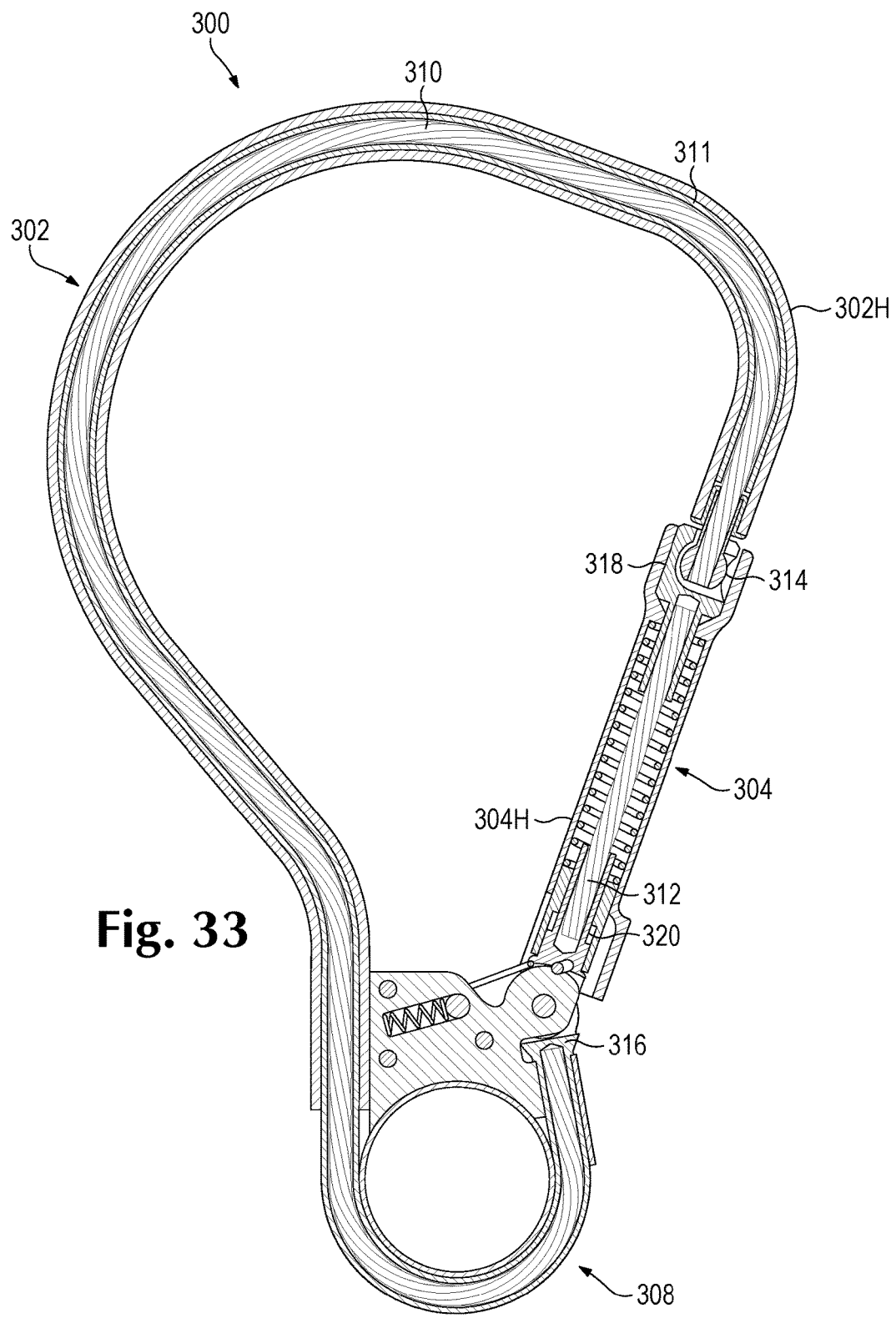
FIG. 33 is a section view of an alternative connecting and anchoring device according to the invention, corresponding to FIG. 16.

FIG. 33 shows an alternative embodiment of a connecting and anchoring device referenced as 300. Corresponding to the spine 102 and gate 104 of the embodiment 100, the embodiment 300 has a spine 302 and a gate 304 for housing, respectively, a spine cable element 310 and a gate cable element 312. The embodiment 300 also has a base 308 corresponding to the base 108 of the embodiment 100. The gate 304 and particularly the manner in which it is pivotally or hingedly mounted to the base 308 differs from the gate 104 in some details which are not pertinent to the following discussion.

In direct correspondence with the embodiment 100, one end of the spine cable element 310 is connected to a ball-shaped spine cable termination structure 314 and the other end is connected to a spine base cable termination structure 316; and one end of the gate cable element 312 is connected to a ball-capturing-shaped gate cable termination structure 318 and the other end is connected to a gate base cable termination structure 320.

Also in direct correspondence with the embodiment 100, the spine 302 has a tubular spine housing 302H, the gate 304 has a tubular gate housing 304H, and the spine cable 310 is preferably sheathed in a protective tube 311 which is preferably formed of a relatively flexible material, such as a polymer material, to protect the cable 310 from being torn or weakened as a result of coming into contact with any such sharp edges of the spine housing in the event of breakage of the spine housing.

As a brief review, the housings are intended to maintain, under normal conditions, a shape of the connecting and anchoring device that is convenient for use of the device as a hook, for hooking onto a structure such as a cell or power-line tower, to provide fall protection. It is intended that these housings will deform, and that they may even break, if a user connected to the device should fall from the structure. In so doing the housings will absorb energy and thereby contribute to reducing the stress on the cable, and in such case, it is intended for the cable elements that are housed by the housings to provide the strength necessary to ensure that the device maintains its connection to the structure, so that the user will not fall very far.

Figure 34:
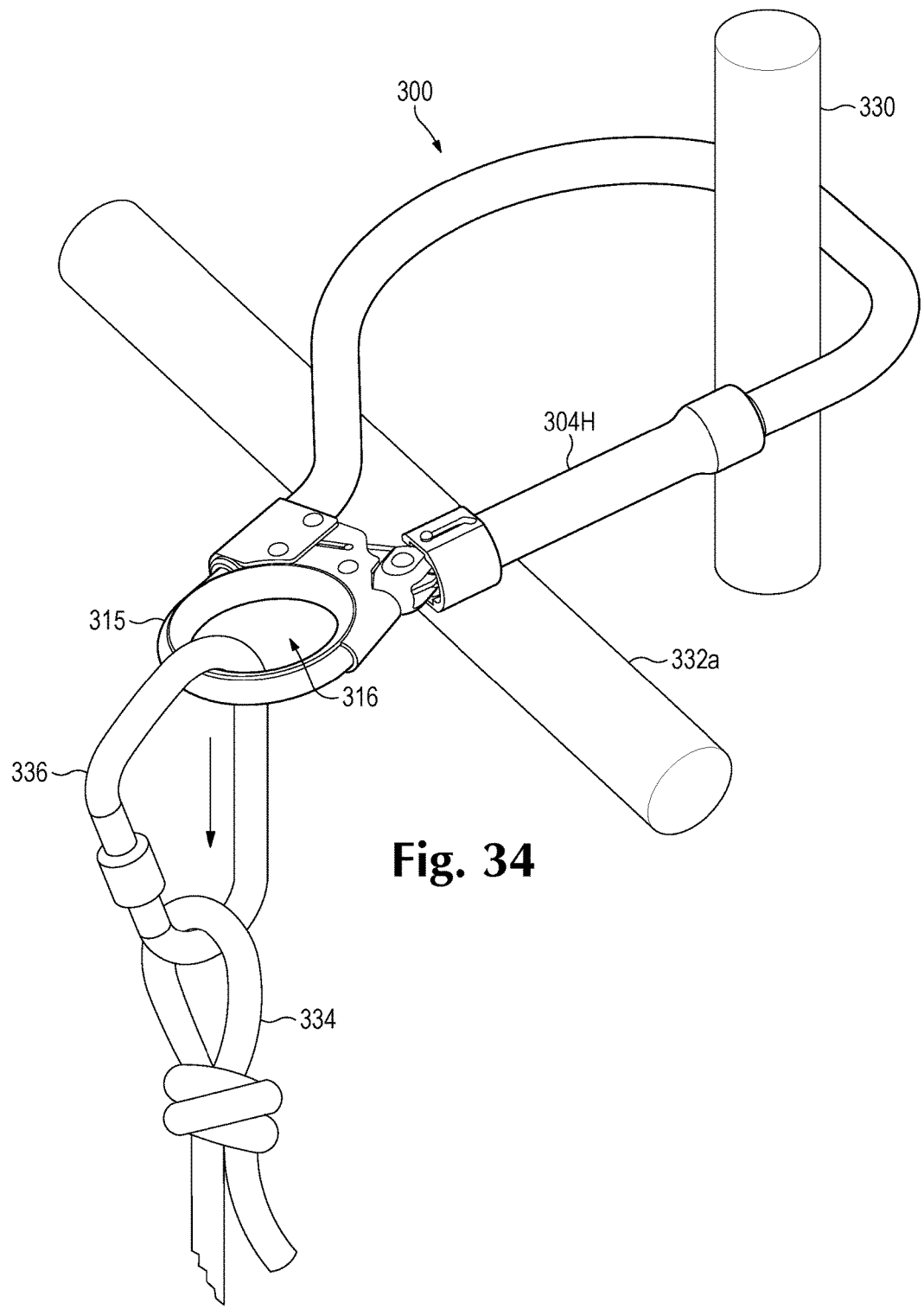
FIG. 34 is an isometric view of the connecting and anchoring device of FIG. 33 shown in a first cross-loaded condition.
Figure 35:
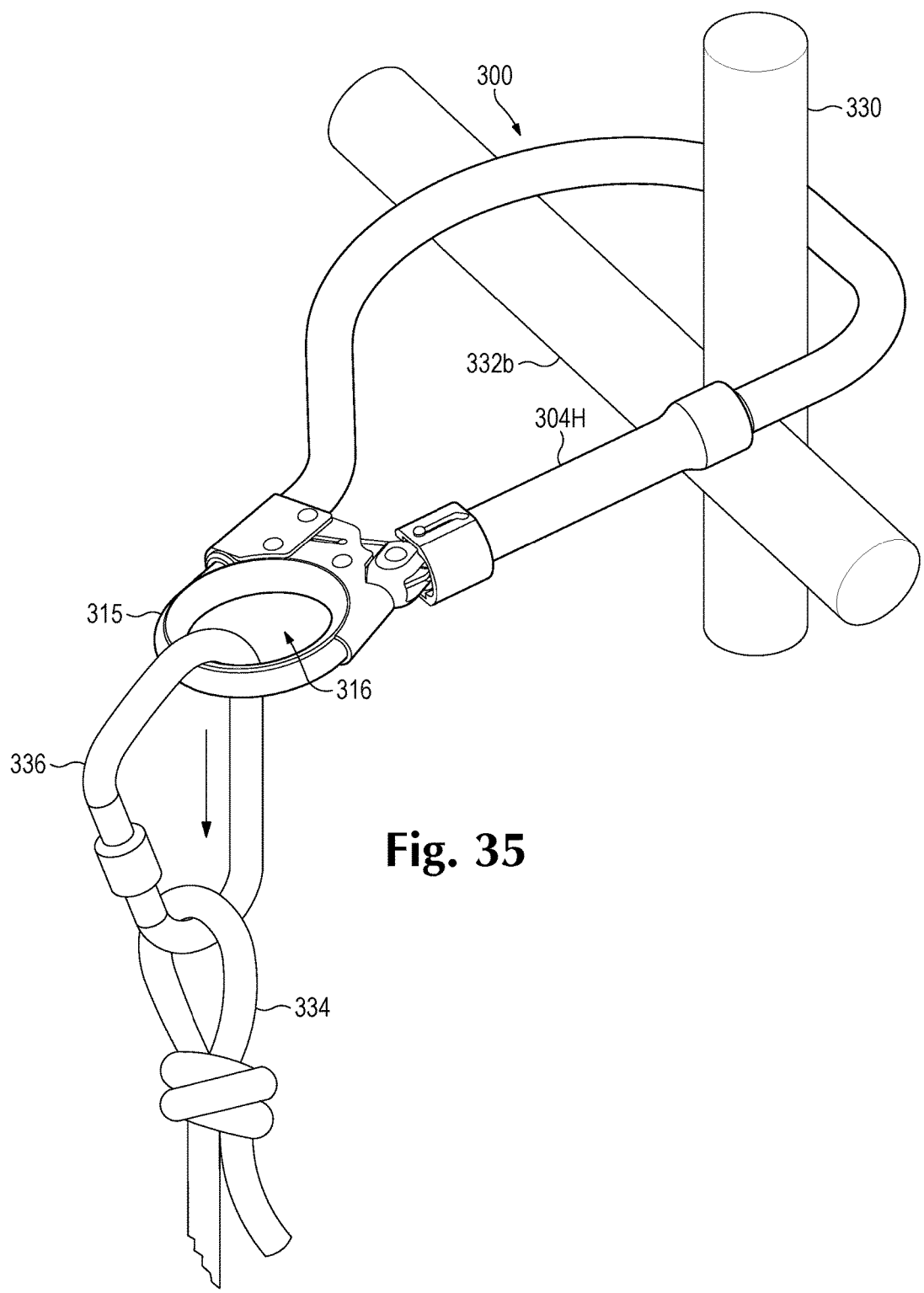
FIG. 35 is an isometric view of the connecting and anchoring device of FIG. 33 shown in a second cross-loaded condition, the cross-loaded conditions of FIGS. 34 and 35 showing a range of cross-loaded conditions.

Referring to FIGS. 34 and 35, it is recognized herein that a connecting and anchoring device is most vulnerable to failure when it is "cross-loaded" such as shown. In these Figures, the device 300 is shown in a horizontal orientation, connected to a vertically oriented elongate structural member 330, but resting on a horizontally oriented elongate structural member 332, specifically 332a in FIG. 34, and 332b in FIG. 35. A user (not shown) of the connecting and anchoring device wears a harness (also not shown) that is connected to a lanyard 334, which in turn is connected via a carabiner 336 to a ring-shaped "connecting-ring" attachment 315 (corresponding to the attachment 34 of the embodiment 10 shown in, e.g., FIG. 1) of the connecting and anchoring device defining a permanently closed carabiner-connecting aperture 316 (corresponding to the aperture through the base 108 of the embodiment 100 shown in, e.g., FIG. 13). If the user falls, the force applied to the connecting and anchoring device is applied vertically downward, at the connection between the carabiner 336 and the connecting ring 315. This force, indicated by the arrow, imposes a bending load on the connecting and anchoring device.

FIGS. 34 and 35 show two extremes of a range of the position of the horizontally oriented structural member 312 over which the connecting and anchoring device is most vulnerable to failure upon being cross-loaded; FIG. 34 showing the horizontal member 322a bearing on the gate 304 at one extreme end thereof, where the gate is connected to the base 308 (FIG. 33), and FIG. 35 showing the horizontal member 332b bearing on the gate at the opposite end thereof, where the gate connects to the spine 302. Over this range, the location of the maximum bending stress applied to the gate housing 304H will likewise range.

Figure 36:
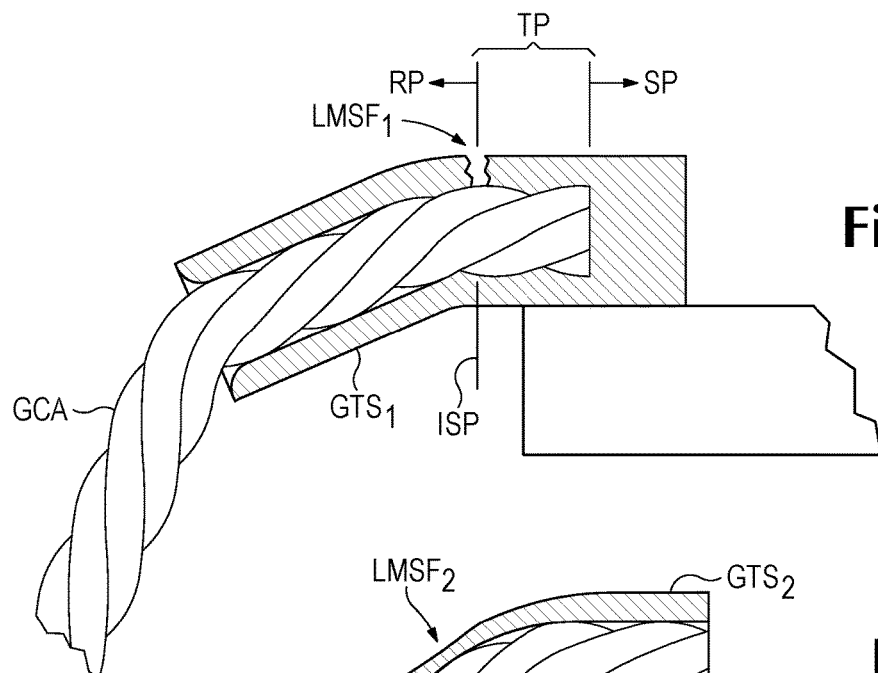
FIG. 36 is a cross-section of a fragment of a cable element and a termination therefor in which the cable element is terminated in a blind hole, the fragment shown subject to a bending load, the Figure showing an interface of maximum susceptibility for breakage of the fragment under the bending load.
Figure 37:
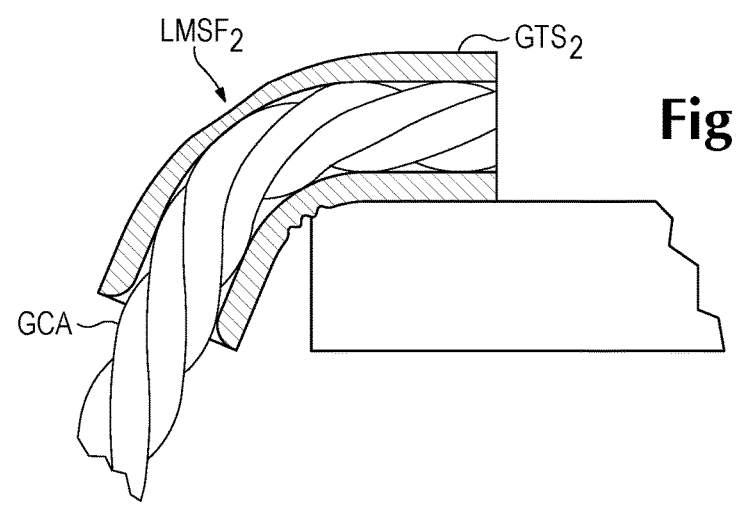
FIG. 37 is a cross-section of fragment of a cable element and a termination therefor in which the cable element is terminated in a through hole, the fragment shown in subject to a first condition of bending under a bending load.
Figure 38:
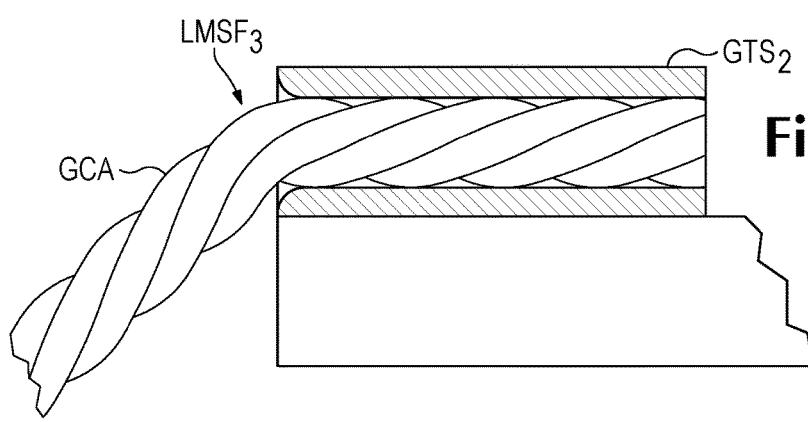
FIG. 38 is a cross-section of a cross-section of the fragment of FIG. 37 shown subject to a second, alternative condition of bending under the bending load, the Figure showing an interface of maximum susceptibility for breakage of the fragment under the bending load.

Referring back to FIG. 33, it also recognized herein that the weakest points in a cable element are at the locations where the cable element is terminated, and in particular that the termination structures 314, 318 and 320 are most vulnerable to failure under a bending load resulting from a cross-loading condition. FIGS. 36-38 show this more particularly.

FIG. 36 illustrates a generic cable element "GCA" (shown without a sheath for clarity and generality) terminated in a generic cable termination structure "$GTS_1$" in which the cable terminates in a blind hole. The location of maximum susceptibility to failure is at "$LSMF_1$," which is close to, but not at, the end of the blind hole.

FIG. 37 illustrates the same cable element GCA terminating in an alternative generic cable termination structure "$GTS_2$," in which the cable terminates in a through hole. The location of maximum susceptibility to failure is at "$LSMF_2$." This location is the same as the location $LSMF_1$ in FIG. 36.

FIG. 38 illustrates the cable element GCA terminating in the same termination structure $GTS_2$ as in FIG. 37, except that the termination structure is supported over its entire length. This moves the location of maximum susceptibility to failure, here referenced as "$LSMF_3$," to the point where the cable enters the termination.

As a general rule more stress will be required to cause failure in the circumstance depicted in FIG. 37 than in the circumstance depicted in FIG. 36. This is because the termination structure $GTS_1$ of FIG. 36 is weaker than the termination structure $GTS_2$ of FIGS. 37 and 38, because there is a solid portion "SP" of the termination structure $GTS_1$ that cannot be crushed, and there is a tolerancing portion "TP" associated with the solid portion that is not crushed, when the termination structure is swaged onto the cable, leaving an interface "ISP," between the tolerancing portion TP and a remaining portion "CRP" which is crushed, at which there is enhanced stress concentration.

This additional stress concentration is eliminated if the cable extends all the way through the cable termination structure as in FIGS. 37 and 38; and it is at least minimized even if the cable doesn't extend all the way through the termination structure if the cable is received in a through hole as provided in the termination structure $GTS_2$, thereby allowing the entire termination structure to compress when it is swaged onto the cable.

In summary, as a general rule the cable elements are most susceptible to failure, when they are subjected to bending loads resulting from cross-loading the connecting and anchoring device, at their terminations; and if a cable extends either partially or all the way through a through hole, this susceptibility is less than if the cable is terminated within a blind hole.

It is, therefore, generally desirable to avoid the use of blind holes when terminating the cable elements, all things being equal; however, there are manufacturing and other considerations that can weigh in favor of their use.

In view of these considerations, it is a further refinement of the concept of providing deformable housings for the cable elements to configure the housings to ensure that failure of the housings occurs away from the locations at which the cable elements are terminated, and especially away from those locations at which the cable elements are terminated in a blind hole, which assists in re-directing the bending load away from these locations, thus providing that failure does not occur at the aforementioned locations of maximum susceptibility, thereby preserving the integrity of the terminations and initiating failure at locations where the cable is free to bend and convert the bending load to a tensile load that the cable is particularly adapted to handle.

In response to this recognition, the invention provides for what will be referred to herein as "weakening features" on the housings, which are provided specifically at locations where it is desired to intentionally weaken the housings so that, especially when subjected to bending as a consequence of cross-loading as described above, they will break at one or more of those locations and will not break at any other locations.

As will be readily appreciated, there are a myriad of different ways to induce weakness in a structure. For example, weakening features may be provided in a monolithic housing in the form of material thickness and/or overall size reductions. Apart from or in conjunction with these strategies, weakening features may also be provided by integrating weaker materials with stronger materials and/or joining materials so as to create a joint that is not as strong as the materials being joined.

Figure 39:
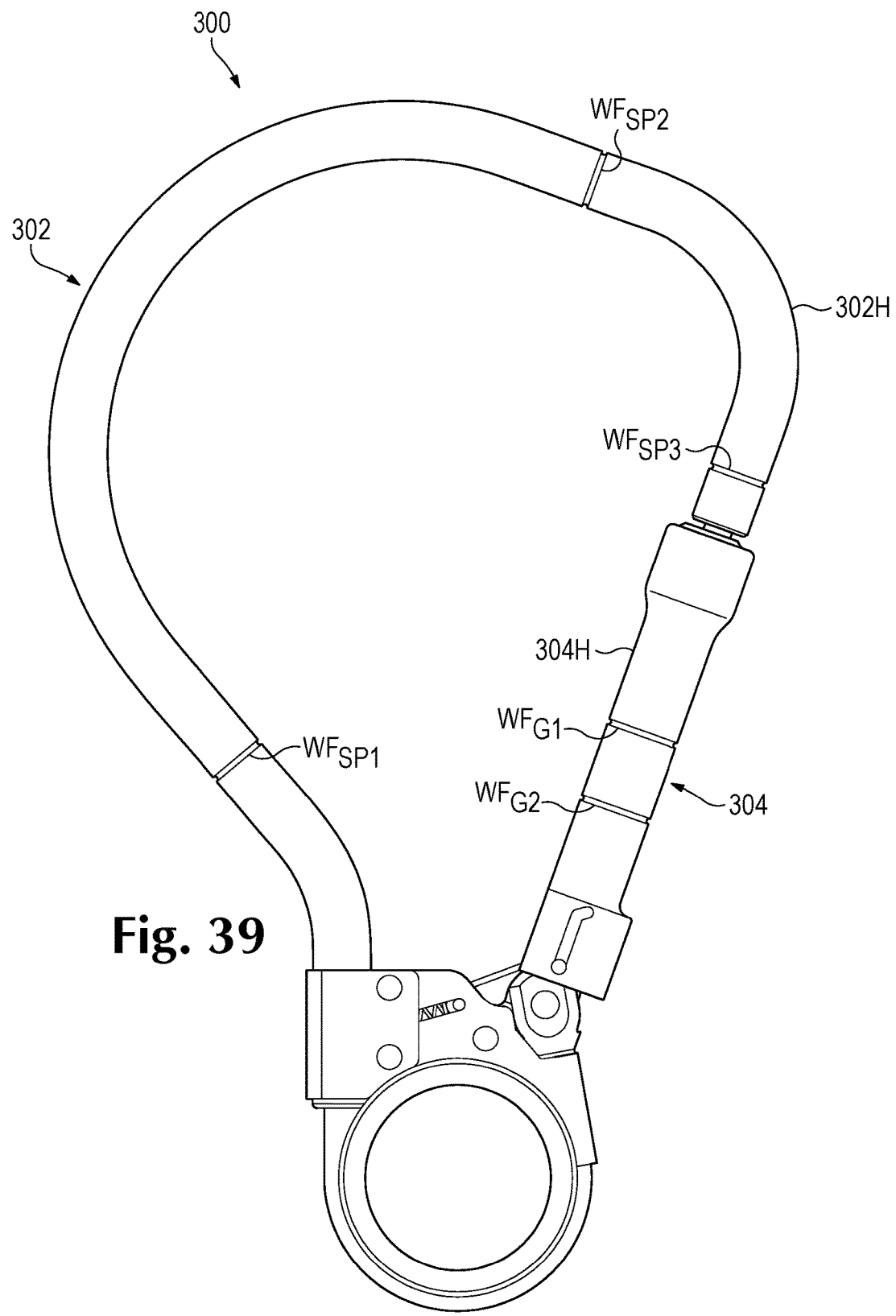
FIG. 39 is an elevation view of a connecting and anchoring device with weakening features according to the invention.

FIG. 39 shows five weakening features "WF1" provided in the connecting and anchoring device 300, which are in the form of a material thickness reduction. Three of these, referenced as "WF1$_{SP1}$," "WF1$_{SP2}$," and "WF1$_{SP3}$," are provided in the illustrated embodiment on the spine housing 302H, and two of these, referenced as "WF1$_{G1}$," and "WF1$_{G2}$," are provided on the gate housing 304H. The weakening features shown here are localized and have a ring-like configuration which allows for producing them by cutting into, but not through, the housings such as by use of a pipe-cutter or a lathe. However, such thickness reductions need not be either localized or ring-like to perform the desired bending load re-directing function.

Figure 40:
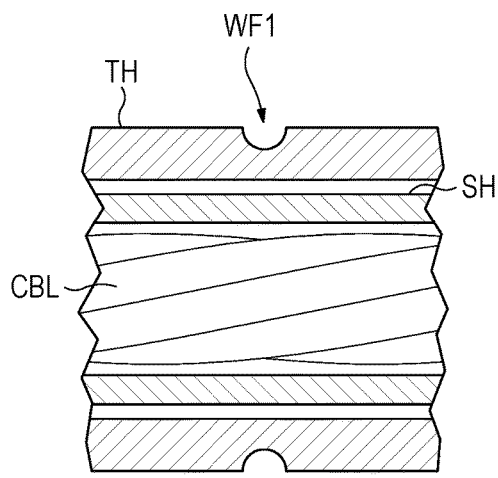
FIG. 40 is a cross-section of a fragment of a housing and cable element of the connecting and anchoring devices shown in FIGS. 14-33 showing a first weakening feature in the housing.

FIG. 40 shows a representative example of the above weakening features WF1 in cross-section, in a tubular housing "TH" having a sheath "SH" and a cable "CBL."

Figure 41:
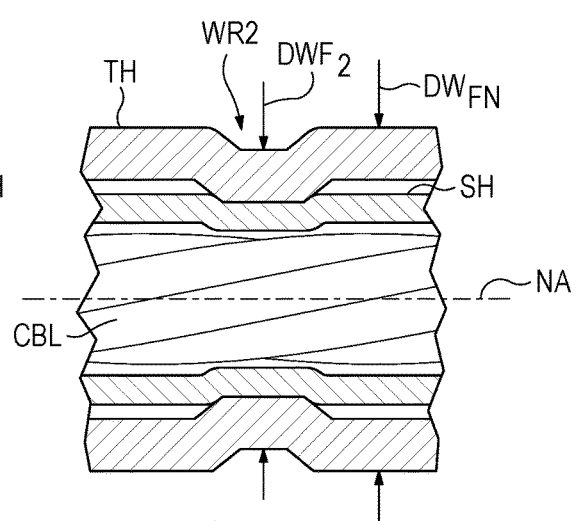
FIG. 41 is a cross-section of the fragment of FIG. 40 showing a second weakening feature in the housing.

FIG. 41 shows an alternative form of weakening feature WF2 in cross-section, in the same housing TH. The weakening feature WF2 is an example of an overall size reduction, where the diameter "DWF2" of the housing is locally reduced from its nominal diameter "DWFN," with no reduction in the wall thickness of the housing. The housing is weaker in bending at the location of the reduction in diameter due to a lower bending moment of inertia about the neutral axis "NA" of the housing. It may be noted that the wall thickness of the housing could be increased at the location of the reduction in diameter to preserve the strength of the housing in tension while still providing the desired weakening in bending.

Figure 42:
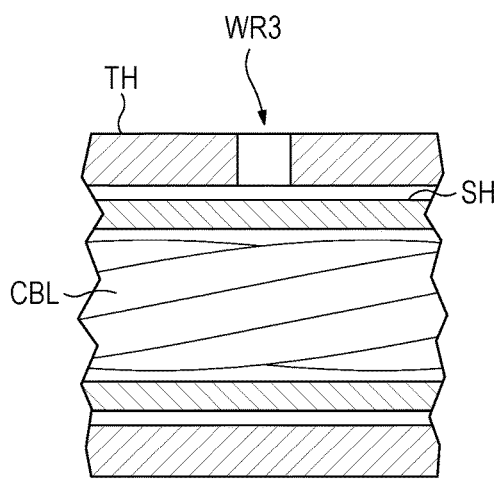
FIG. 42 is a cross-section of the fragment of FIG. 40 showing a third weakening feature in the housing.

FIG. 42 shows another alternative form of weakening feature WF3 in cross-section, in the same housing TH. The weakening feature WF3 is an extreme example of a material thickness reduction, i.e., the weakening feature WF3 is a through hole that reduces the thickness, at the location of the hole, of the wall of the housing in which it is provided, to zero.

Figure 43:
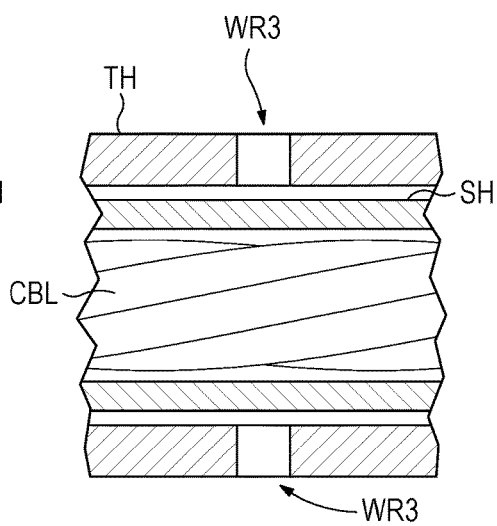
FIG. 43 is a cross-section of the fragment of FIG. 40 showing two of the third weakening features of FIG. 42 in the housing.

The weakening feature WF3 could be provided through one side of the housing TH as shown in FIG. 42, or through two or more sides of the housing such as shown in FIG. 43.

Figure 44:
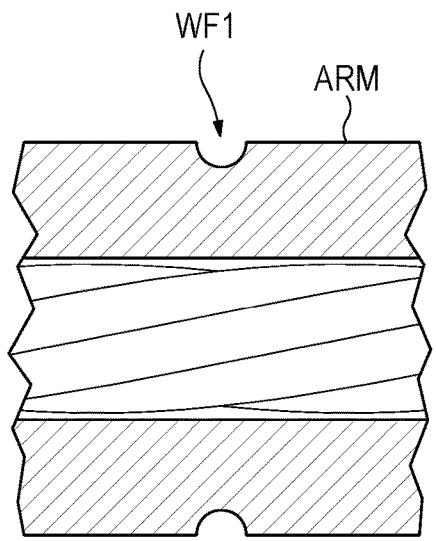
FIG. 44 is a cross-section of a fragment of a housing and cable element of the connecting and anchoring device shown in FIGS. 1-13 showing the first weakening feature in the housing.
Figure 45:
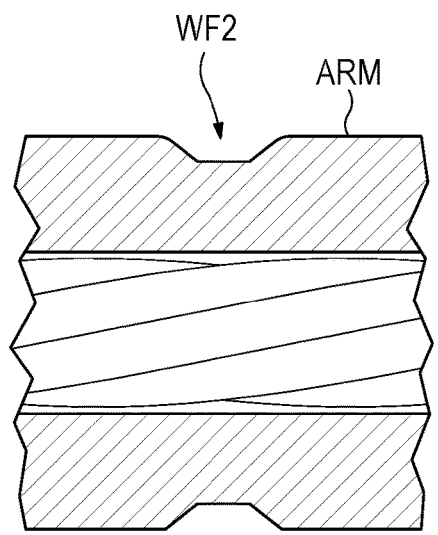
FIG. 45 is a cross-section of the fragment of FIG. 44 showing the second weakening feature in the housing.
Figure 46:
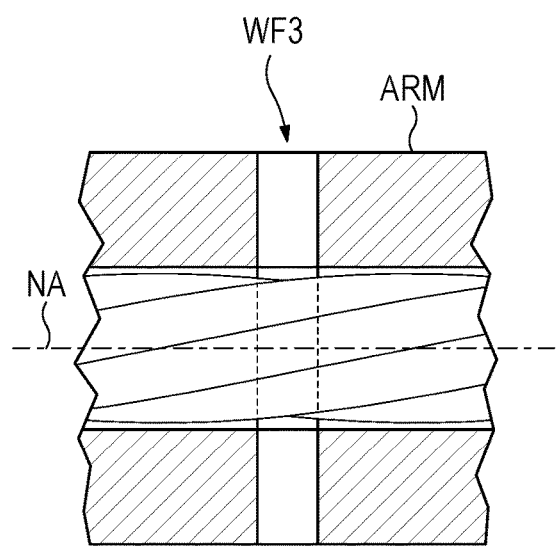
FIG. 46 is a cross-section of the fragment of FIG. 44 showing the third weakening feature in the housing provided in a first orientation.
Figure 47:
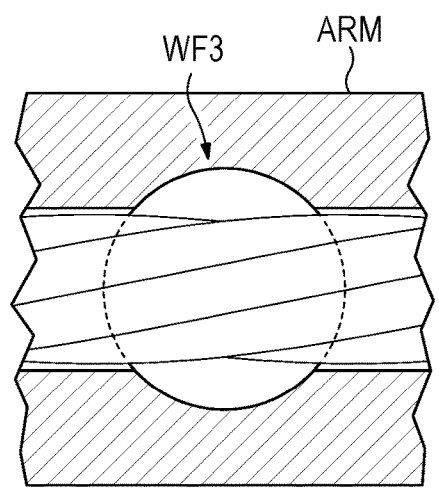
FIG. 47 is a cross-section of the fragment of FIG. 44 showing the third weakening feature in the housing provided in a second orientation.

FIGS. 44 and 45 show, respectively, a representative example of the weakening features WF1 and WF2 provided in the arms 12 and/or 14, referenced generically in the Figures as "ARM" of the embodiment 10 of the connecting and anchoring device; FIG. 46 shows a representative example of the weakening feature WF3 provided in the same embodiment in a first orientation perpendicular to the neutral axis of the arm, and FIG. 47 shows a representative example of the same weakening feature (shown enlarged) provided in a second orientation perpendicular to the first. It may be noted that in all embodiments, other material thickness or overall size reductions could be provided in different locations or orientations to those shown and described above.

Figure 48:
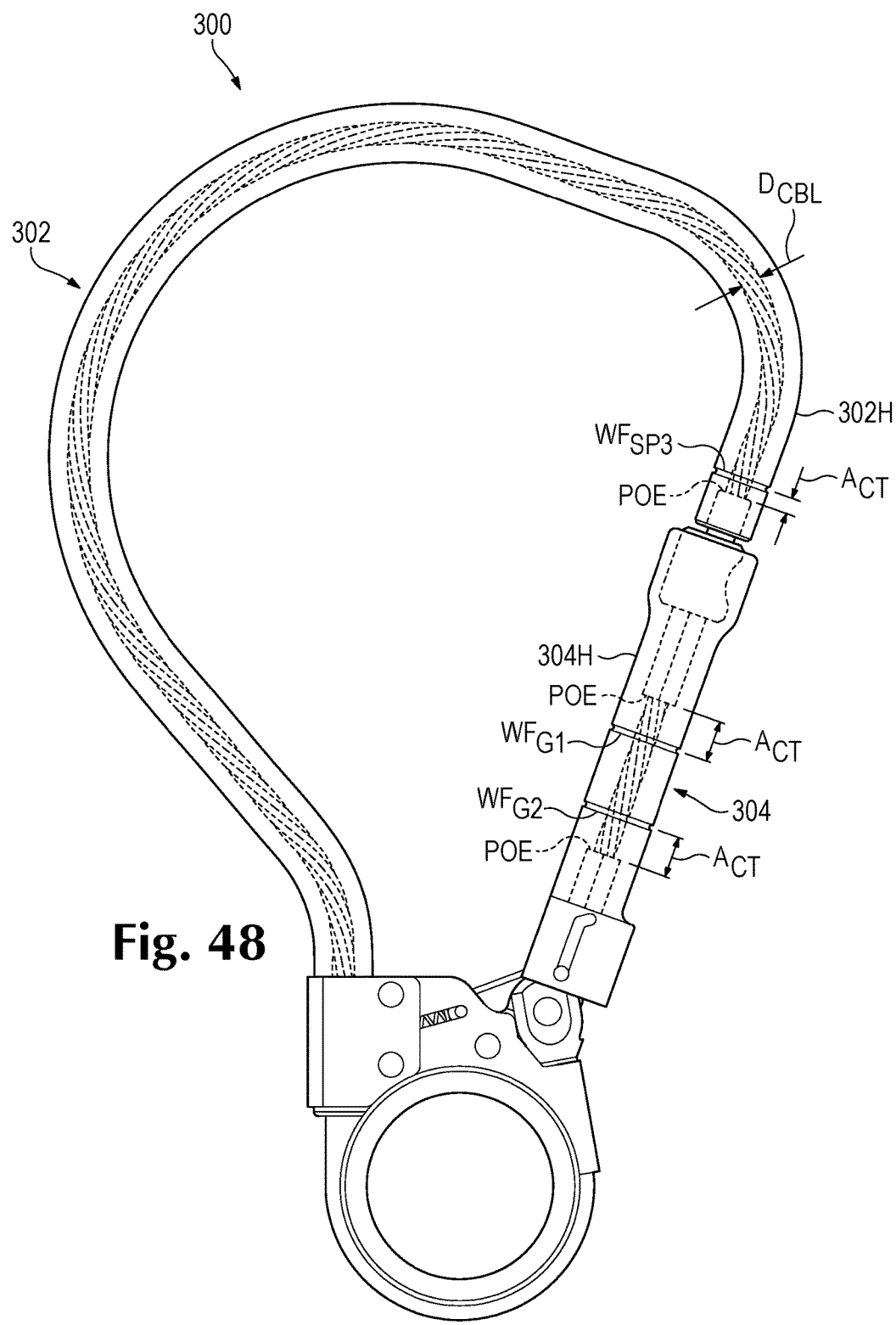
FIG. 48 is a schematized view of a generic connecting and anchoring device according to the invention showing preferred locations for weakening features such as those shown in FIGS. 40-47 according to the invention.

FIG. 48 shows preferred locations at or over which weakening features are provided on housings according to the invention. Each cable termination "CT" has associated with it a dimension "$A_{CT}$" which specifies the minimum and maximum distances between a weakening feature and the termination. The dimension $A_{CT}$ is preferably no closer to the point of entry "POE" of a cable element into a cable termination structure than about ¼ of the nominal diameter of the cable (dimension "$D_{CBL}$"). The weakening feature ensures that the housing for a cable will deform and/or fail under load no closer to the point of entry of that cable into its termination structure than a distance of about ¼ of the nominal diameter of the cable. As noted previously, it is particularly desirable that weakening features according to the invention ensure such deformation and/or failure in the circumstance where the device becomes cross-loaded so that a bending force is applied to the gate housing.

Accordingly, a weakening feature should be spaced no closer to the POE of a cable into a cable termination structure than a distance of about ¼ of the nominal diameter of the cable.

Also accordingly, there is no maximum distance away from a POE of a cable into a cable termination structure for a weakening feature, except where that would bring the weakening feature too close to a point of entry of a cable into another cable termination structure, and except that it is preferable to provide at least one weakening feature on a housing, e.g., the weakening feature WF$_{SP3}$ on the spine housing 302H, and either of the weakening features WF$_{G1}$ or WF$_{G2}$ on the gate housing 304H, of the embodiment 300 shown.

For purposes herein, a "cable element" has two "terminations," one at each extreme end of the cable element.

As noted previously, a device that is rated for fall protection has the capability to withstand, without breaking, a 5,000 pound force tensile load. The nominal diameter of a typical steel cable that satisfies this requirement is 7/32 inches or more, such as ¼ inch. However, as will be readily appreciated by persons of ordinary skill, this metric depends on a number of variables, such as the desired corrosion resistance of the device, the intended temperature range over which the device is rated, the device size and cost.

FIGS. 49-60 show another example of a connecting and anchoring device 400 according to the invention. The device 400 differs from the previous embodiments in that it employs a single cable and has a modified gate mechanism. Otherwise, however, all the features, considerations, alternatives, and specifications described above apply to the device 400 as for the other embodiments.

Figure 53:
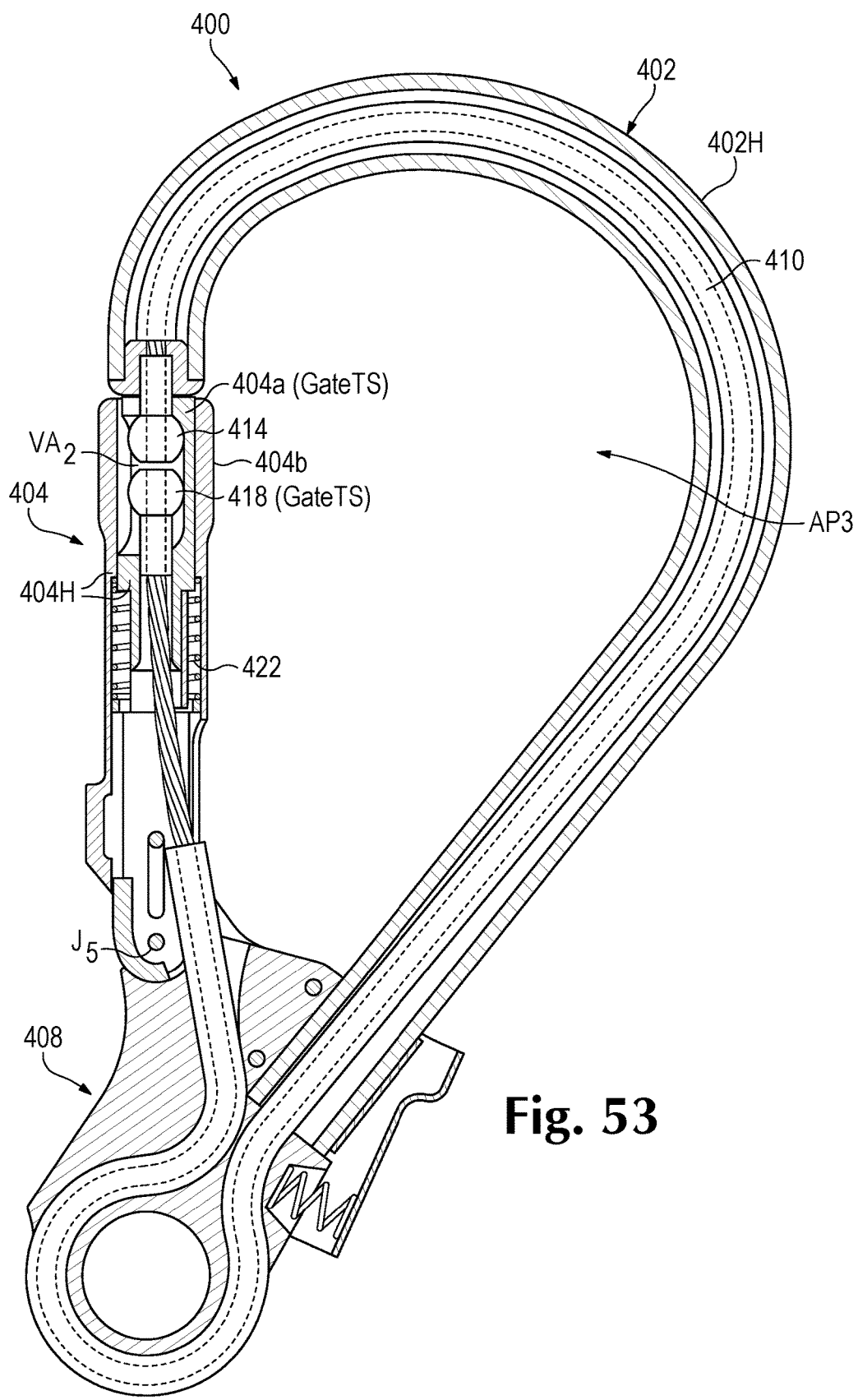
FIG. 53 is a sectional elevation view of the connecting and anchoring device of FIG. 49, corresponding to FIG. 50.

Referring particularly to FIG. 53, the device 400 has a tubular spine 402, a gate 404, and a base 408. The spine 402 has a spine housing 402H, and the gate 404 has a housing 404H comprising two portions 404a and 404b that will be discussed further below, that house corresponding portions of a cable element 410 which is a single cable that extends between two termination structures at opposite ends of the cable, which in this embodiment are a ball-shaped spine termination structure 414, at the spine end of the cable, and a gate termination structure "GateTS" at the gate end of the cable which is a combination of, in this embodiment, a spine termination capturing element 404a, and a capturing element retaining member 418 for retaining the capturing element 404a on the gate end of the cable element. The capturing element and retaining member portions of the gate termination structure will be discussed further below. For present purposes of definition, the cable element extends "uninterrupted" between the spine termination structure 414 and the gate termination structure GateTS, because, between these two structures, the cable element is a single cable with no intermediating cable terminating structures.

In particular and as depicted in the Figures, the cable 410 extends uninterrupted from the spine 402, through the base 408 and into the gate 404, past the pivot joint $J_5$, which eliminates the intermediating spine base and gate base termination structures 116 and 120 of the device 100 described above.

It may be noted that the base 408 could be eliminated by pivotally attaching the gate directly to the spine.

Figure 54:
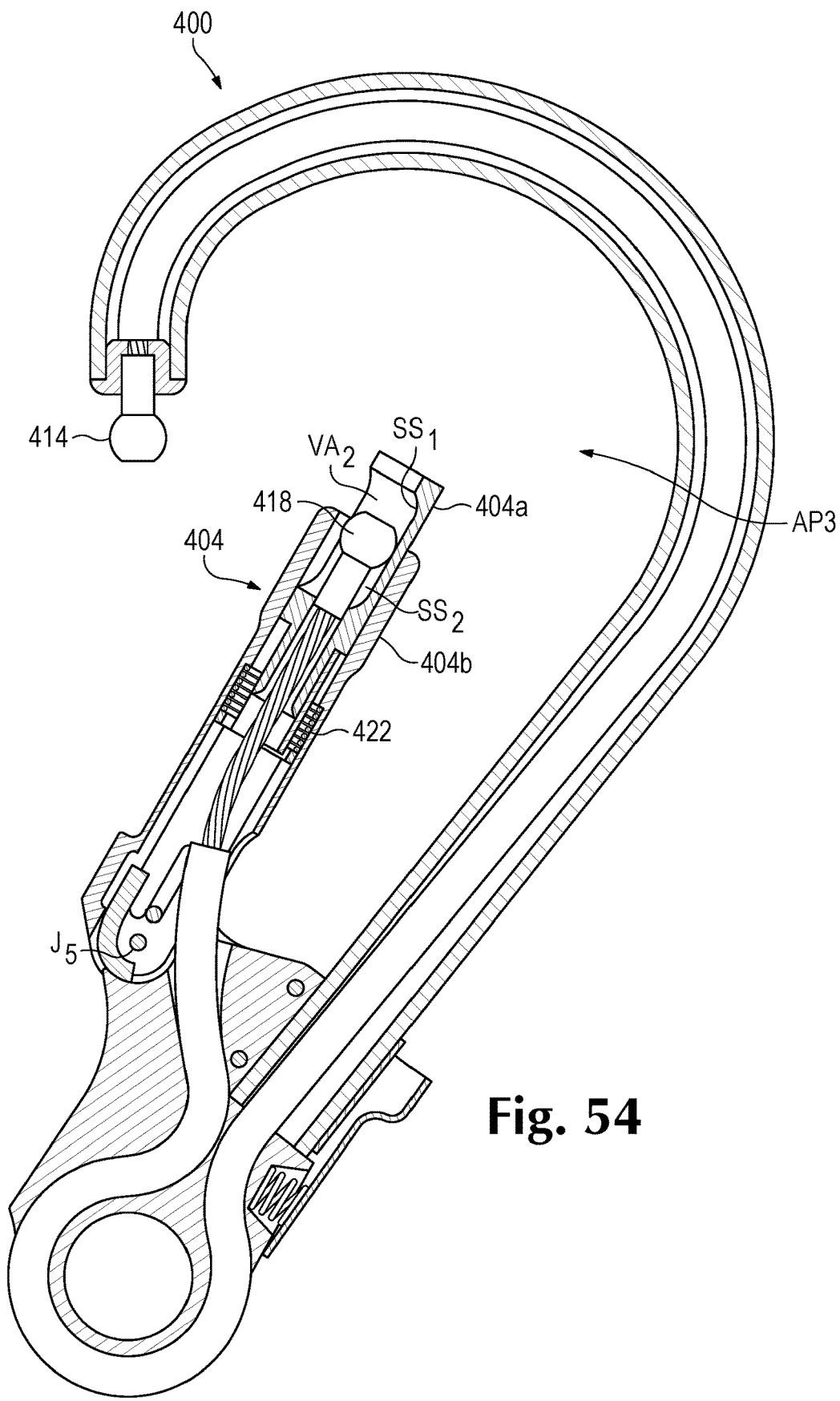
FIG. 54 is a sectional elevation view of the connecting and anchoring device of FIG. 49, corresponding to FIG. 52, showing a partially open configuration of the device.
Figure 55:
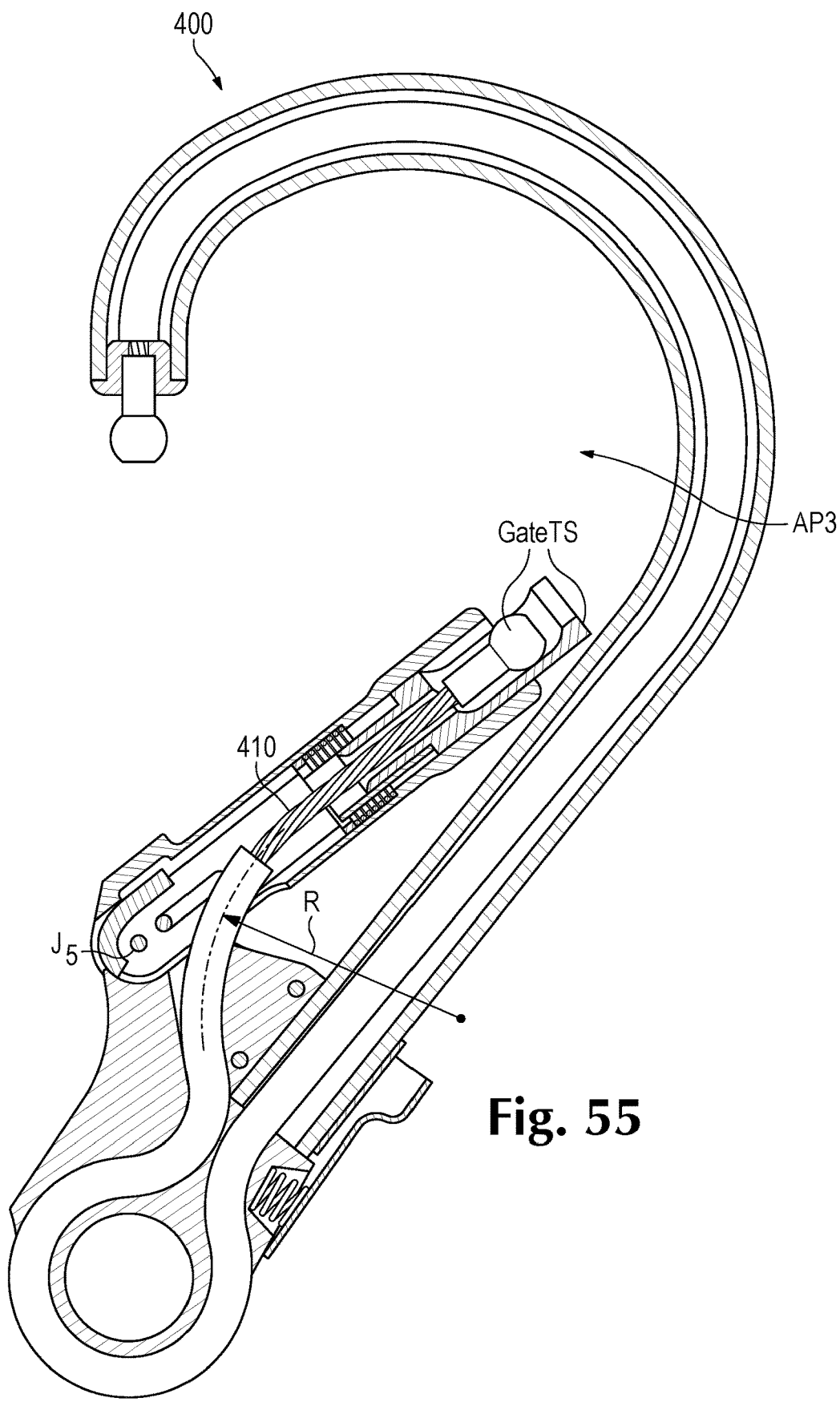
FIG. 55 is a sectional elevation view of the connecting and anchoring device of FIG. 49, showing a fully open configuration of the device.

The device 400 defines a connecting aperture "AP3." The spine housing 402H is rigidly connected to the base 408, such as by clamping, and the gate housing 404H is pivotally connected to the base so that the gate housing can undergo pivoting relative to the spine housing about a pivot joint "$J_5$," so that the device can be configured wherein the aperture AP3 is closed, as shown in FIG. 53, or open such as shown in FIGS. 54 and 55.

Figure 49:
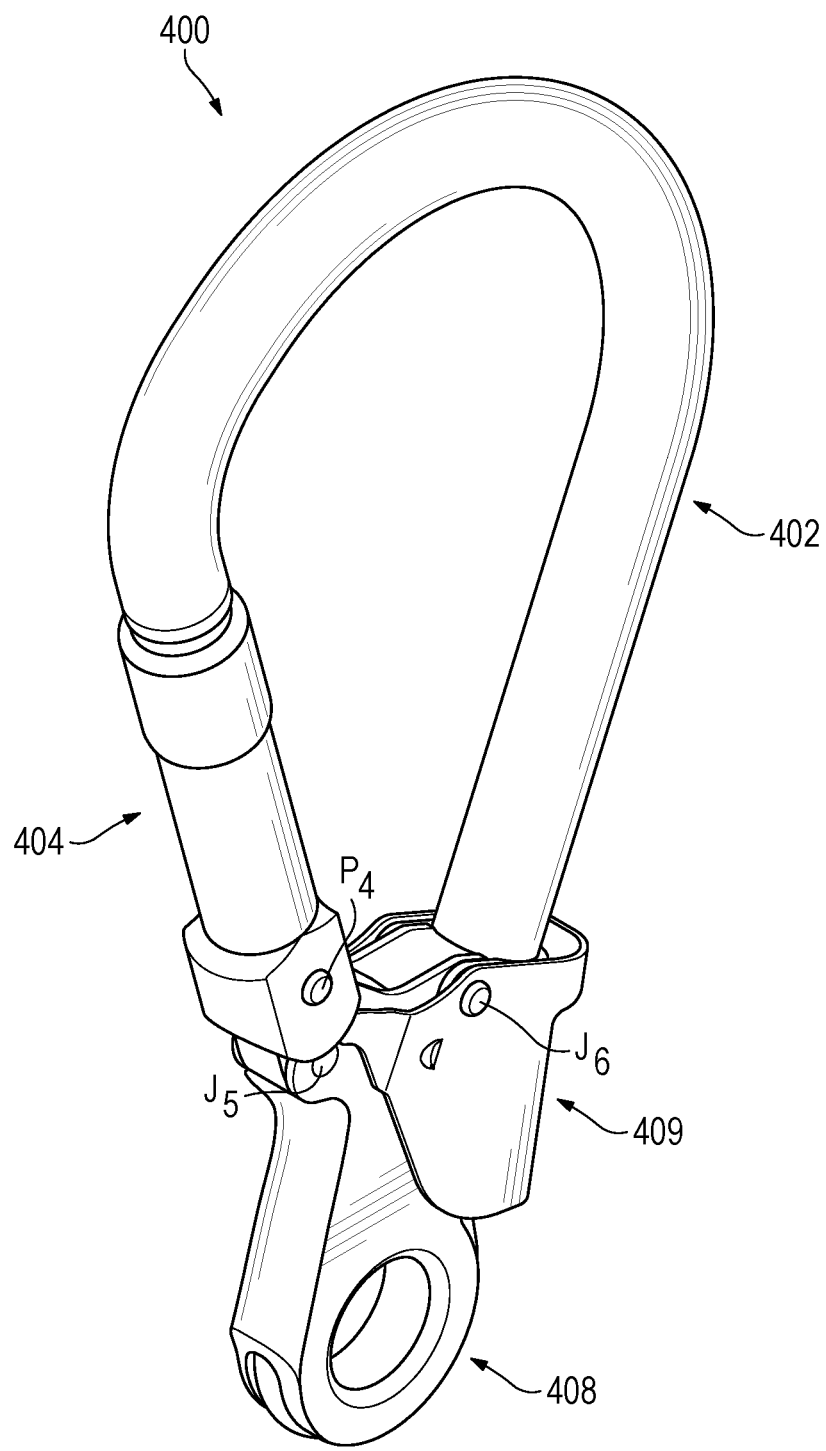
FIG. 49 is an isometric view of a fourth embodiment of a connecting and anchoring device according to the invention.

As best seen in FIG. 54, the gate termination structure GateTS includes the aforementioned spine termination capturing element 404a, which has a void area "$VA_2$" providing sufficient space for permanently receiving therein the aforementioned retaining member 418, and for temporarily receiving and capturing therein the spine termination structure 414 when the device 400 is in the closed configuration shown in FIGS. 49, 50 and 53.

In this embodiment, though it is not essential, the spine termination structure 414 is ball-shaped, and therefore the spine termination capturing element 404a of the gate termination structure GateTS includes a partially spherical complementary mating shape or structure defined by the concave surface "$SS_1$," for mating with the spine termination capturing element. The mating geometry of the spine termination structure 414 and the spine termination capturing element 404a allows for connecting the gate end of the cable element together for supporting, at least in significant part, the load imposed on the connecting and anchoring device if there is a fall.

In this respect, the device 400 is the same as the previous embodiments, i.e., the gate and spine cable termination structures have complementary mating shapes or structures, and the device provides for changing between a first configuration of the device in which the complementary mating shapes or structures, and therefore the gate and spine termination structures each as whole, are locked together so as to inhibit separation thereof, and a second configuration in which the complementary mating shapes or structures, and therefore the gate and spine termination structures each as a whole, can be freely separated from one another.

Also in this embodiment, though it is not essential, the retaining member 418 of the gate termination structure GateTS is ball-shaped, and therefore the spine termination capturing element 404a also has a partially spherical complementary mating shape or structure defined by the concave surface "$SS_2$," for mating with the retaining member. However, the retaining member 418 merely retains the spine termination capturing element 404a on the gate end of the cable element 410. Accordingly, as can be readily appreciated, it is not critical that the retaining element and spine termination capturing element have complementary mating shapes or structures. It is, however, desirable to use complementary ball and socket shapes or structures in the mating parts to minimize seating stresses, and such shapes provide good tolerance of misalignment due to their symmetry.

As best seen in FIG. 53, the gate 404 also includes a manually manipulable locking element or, more specifically in this embodiment, a sleeve portion 404b which is spring-biased by a spring 422 relative to the spine termination capturing element 404a to enclose and thereby lock together the gate and spine termination structures, as shown in FIGS. 50 and 53, so as to inhibit separation of the termination structures.

Manipulating the sleeve portion 404b of the gate 404, to move in the direction of the arrow shown in FIG. 51 and retract the sleeve portion 404b toward the base 408, partially uncovers the spine termination structure 414 to allow for a next step of manually pivoting the gate in the direction of the arrow shown in FIG. 52 and opening the aperture AP3. The device continues to be closed, but is now in an unlocked configuration, in which the sleeve portion 404b has been moved to a "retracted position."

As the user pivots the gate 404 in the direction of the arrow in FIG. 52, from a partially-open orientation shown in FIGS. 52 and 54 to a fully-open orientation shown in FIG. 55, the retaining member 418 of the gate termination structure GateTS slides further up into the void area $VA_2$ of the capturing element 404a, occupying space therein that was previously occupied by the spine termination structure 414 (see FIG. 55). This action is a consequence of the pivot joint $J_5$ being outside the circle defining a minimum bend radius "R" of bending the cable element 410 in FIG. 55.

As noted above, in embodiments where a cable element extends uninterrupted through a pivot joint at a particular location, as is the case here, care should be taken to reduce or minimize the potential for cable fatigue due to bending at that location. To minimize such cable fatigue, the aforementioned bend radius "R" is preferably at least 2.0 inches when using 3/16 inch nominal diameter steel wire rope for the cable element 410, and greater for a larger diameter cable, for which bending stresses would be greater.

It is not essential that the pivot joint $J_5$ lie outside of the circle defining the minimum bend radius "R" as shown in FIG. 55. The pivot joint $J_5$ could lie inside the circle, in which case the sliding action described above would be reversed, so that the retaining member 418 would slide further up into the void area $VA_2$ as the gate 404 is being closed, leaving less space for the spine termination structure 414 in the closed configuration of the device. However, more space could be provided by lengthening the void area, and the capturing element as well if need be, in accommodation. More space could also be provided by shortening the spine termination structure 414.

It would also be possible to provide that the pivot joint $J_5$ lies on the circle defining the minimum bend radius "R" in FIG. 55, i.e., to ensure that the cable element 410 passes through or is maintained in alignment with the pivot joint $J_5$. In such case there would be no need to allow for the sliding action referred to immediately above; however, this may add undesirable complexity to the implementation of the pivot joint.

Figure 56:
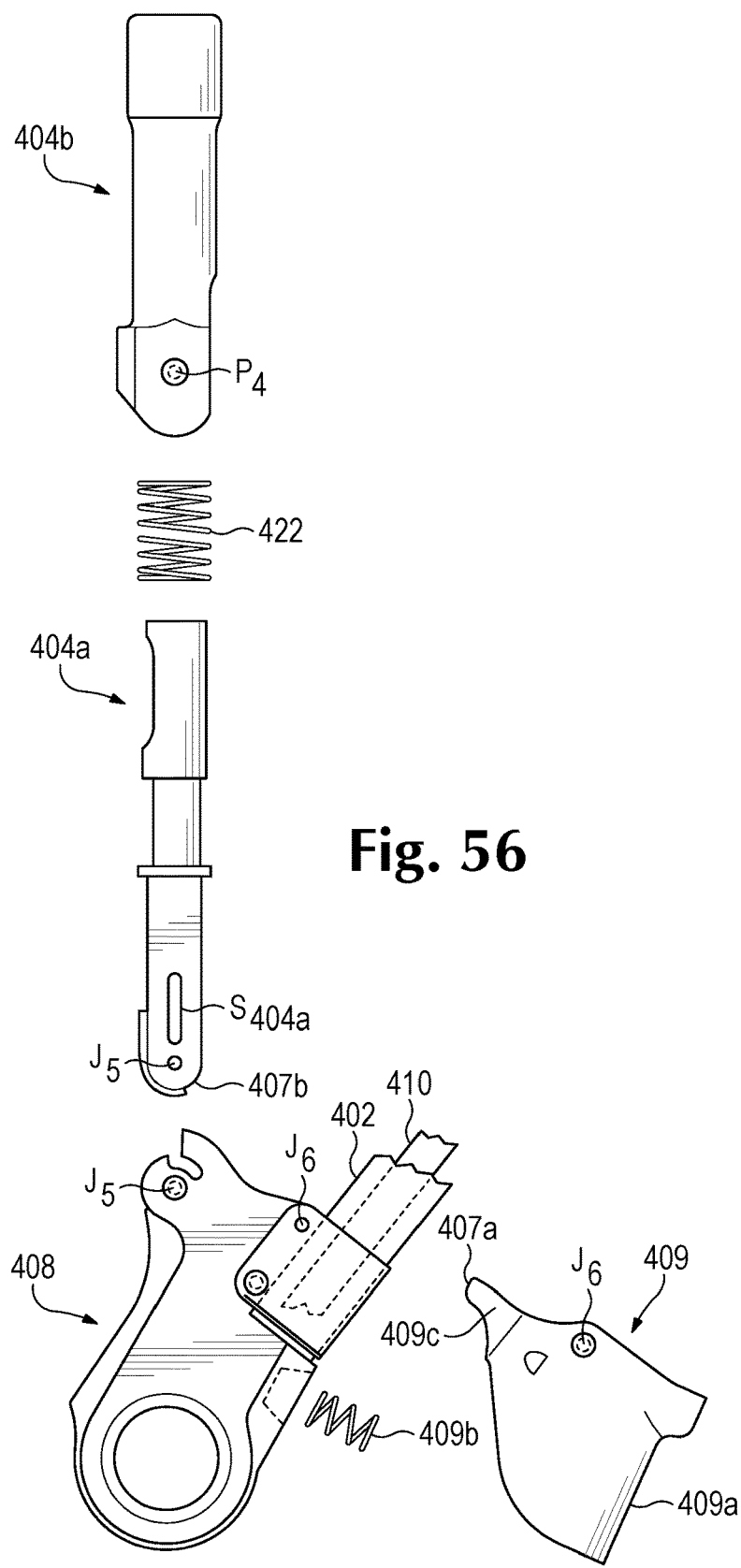
FIG. 56 is an exploded elevation view of a gate and base of the connecting and anchoring device of FIG. 49 according to the invention, the base portion including a safety mechanism according to the invention.

FIG. 56 shows the gate 404 exploded from the base 408. A pin "$P_4$" of the sleeve portion 404b of the gate 404 rides in an elongate slot "$S_{404a}$" of the ball-capturing portion 404ba as the sleeve portion is moved in the direction of the arrow shown in FIG. 51. But the device 400 preferably also includes a safety mechanism 409 (see also FIG. 49) which prevents this motion, maintaining the device in the aforementioned locked configuration, unless the user continues to depress a trigger 409a, placing the safety mechanism 409 in a "triggered" condition, serving to place the device in an unlocked configuration.

Figure 58:
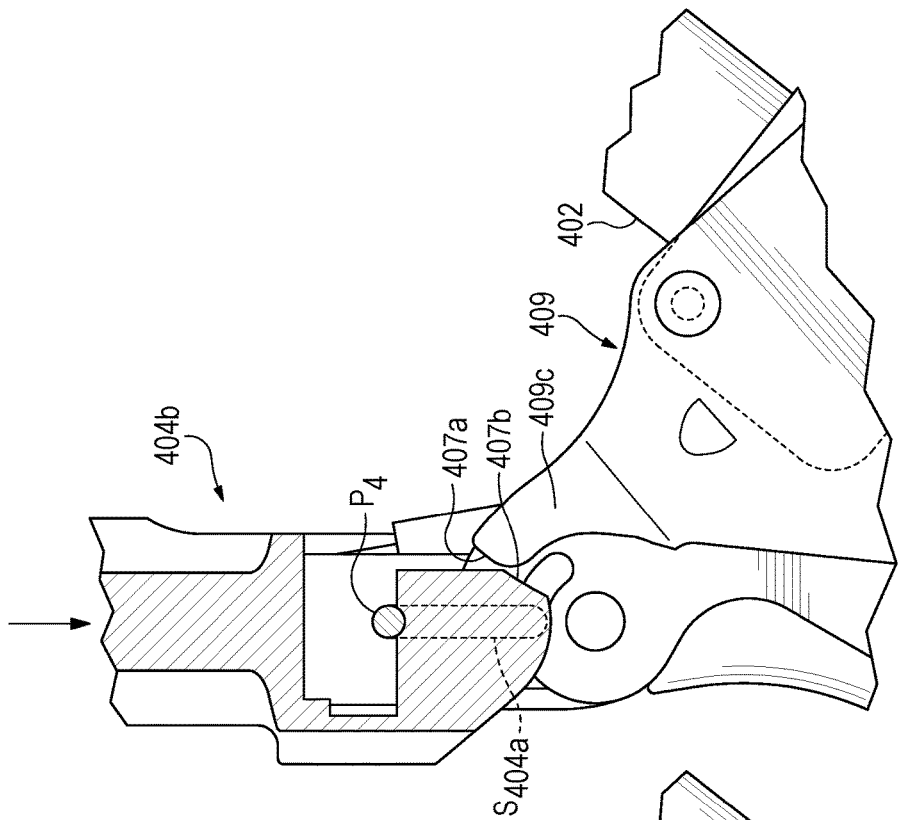
FIG. 58 is a detailed view corresponding to that of FIG. 57, showing a next step of operation of the connecting and anchoring device after that shown in FIG. 57, in which the gate remains in the un-retracted position and the device remains closed, but the safety mechanism is now in a triggered condition and the device is now in an unlocked configuration.
Figure 57:
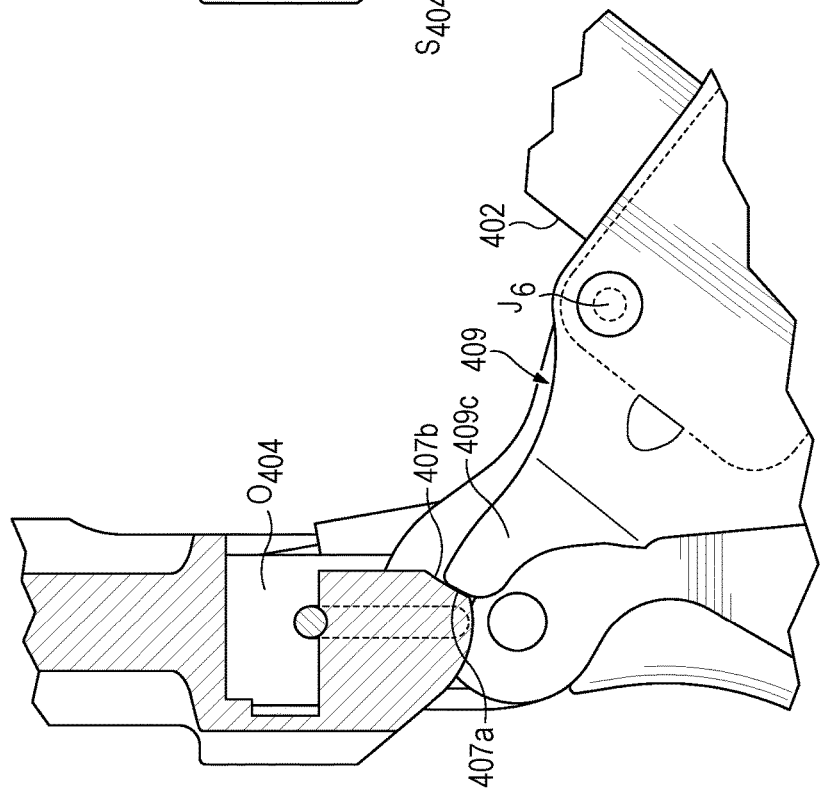
FIG. 57 is a detailed view of an interaction between the gate, base and safety mechanism of the connecting and anchoring device of FIG. 49, showing the gate in an un-retracted position, the safety mechanism in an un-triggered condition, and the device in the closed and locked configuration shown in FIG. 50.

Depressing the trigger 409a rotates, against a spring-bias provided by a compression spring 409b, a stop 409c about a pivot point "$J_6$" (see also FIG. 49), so that an end 407a of the stop clears a corresponding end 407b of the sleeve portion 404b of the gate 404, sufficient to allow the sleeve portion to be moved in the direction of the arrows in FIGS. 51 and 58. This action can be seen by comparing FIGS. 57 and 58. At this point, the pin $P_4$ of the sleeve portion 404b of the gate 404 resides at the top of the elongate slot $S_{404a}$.

While continuing to hold down the trigger 409a, and thereby continuing to maintain the triggered condition of the safety mechanism and thereby maintain the unlocked configuration of the connecting and anchoring device, the sleeve portion may now be moved in the direction of the arrows shown in FIGS. 52 and 58, so that the pin $P_4$ of the sleeve portion is moved to the bottom of the elongate slot $S_{404a}$ as shown in FIG. 59, and the sleeve portion 404b is in position to allow the gate 404 to be rotated in the direction of the arrows in FIGS. 52 and 60. This rotation is now allowed by virtue of the (male) pin $P_4$ being aligned for receipt within a (female) curved slot $S_{408}$, with the curved slot retaining the pin and thereby holding the sleeve portion in the retracted position over the course of pivoting the gate as indicated in FIG. 52.

This rotation also captures the end 407a of the safety mechanism 409 within an opening $O_{404}$ in the gate 404, maintaining the safety mechanism in its triggered condition over the course of pivoting the gate without need for the user to maintain force on the trigger. This function of capturing the (male) end 407a within the (female) opening $O_{404}$ is facilitated by providing a curvilinear shape for the end 407a similar to that of the curved slot $S_{404a}$.

It should be understood that where two structures, such as for example the gate 404 and the base 408, or the safety mechanism 409 and the gate 404 of the device 400, or the pin $P_2$ and the cover portion 224 of the device 200, have corresponding male and female mating structures, such as for example, respectively, the pin $P_4$ and the curved slot $S_{408}$, the end 407a and the opening $O_{404b}$, or the guide element 219 and the key structure 221, the male and female features can generally be reversed; e.g., the pin $P_4$ could be made a feature of the base 408, and the curved slot $S_{408}$ could be made a feature of the gate 404.

Where termination structures are fixedly attached to cable elements, such as the spine termination structure 414 at the spine end of the cable element 410, and the retaining member 418 at the gate end of the cable element, the termination structures may be and typically would be attached by swaging, although other attachment methods and manufacturing processes could be used as well, as will be readily appreciated by persons of ordinary mechanical skill.

As noted previously, in the device 400 the spine termination capturing element 404a of the gate termination structure is retained on the end of the cable element by the retaining member 418 of the gate termination structure GateTS. The spine termination capturing element is otherwise, preferably, allowed to slide on the cable element in response to pivoting the gate 404 as described above.

The single cable element 410, terminated at one end by a gate termination structure and terminated at the opposite end by a gate termination structure, where the termination structures have complementary mating shapes or structures, forms an integral closed loop in the closed configuration of the device shown in FIG. 53. This loop is preferably provided so that it will be capable by itself, without relying on the spine housing, the gate housing or the base and without breaking or opening, of supporting the entire rated (5,000 pound) load that could result from a fall by a person tethered to the device 400, where the device is in its closed and locked configuration with its connecting aperture surrounding a suitable structural member of a support structure, such as shown for the connecting and anchoring device 300 in FIGS. 34 and 35.

It is to be understood that, while specific connecting and anchoring devices have been shown and described as being preferred, variations may be made, in addition to those already mentioned, without departing from the principles of the invention.

The terms and expressions which have been employed in the foregoing specification are used therein as terms of description and not of limitation, and there is no intention in the use of such terms and expressions to exclude equivalents of the features shown and described or portions thereof, it being recognized that the scope of the invention is defined and limited only by the claims which follow.

The invention claimed is:

1. A connecting and anchoring device, comprising:
   a base;
   a cable element terminating at opposite ends thereof in respective gate and spine cable termination structures;
   a gate housing for housing a gating portion of the cable element, the gate housing including a manually manipulable locking element, the device configured to provide for changing between a first configuration of the connecting and anchoring device in which the termination structures are locked together so as to inhibit separation thereof, and a second configuration in which the termination structures can be freely separated from one another by manipulation of the locking element, and wherein the device in at least the first configuration defines a closed aperture therethrough; and
   a spine housing for housing a spinal portion of the cable element, wherein the gate housing can pivot about a pivot joint relative to the spine housing in response to manual manipulation of the connecting and anchoring device so as to change the configuration of the connecting and anchoring device between the second configuration and a third configuration of the connecting and anchoring device in which the aperture is open, wherein the cable element includes a cable that extends uninterrupted from the spine housing and into the gate housing, past said pivot joint.

2. The apparatus of claim 1, wherein the cable element includes a cable that extends uninterrupted between the gate and spine termination structures so as to form a single cable loop.

3. The apparatus of claim 2, wherein the locking element is subject to a first spring bias that biases the locking element in a locking position for maintaining the gate and spine cable termination structures in the first configuration of the connecting and anchoring device, wherein the locking element must be forced into a retracted position, against the first spring bias, to place the connecting and anchoring device in the second configuration, and wherein the locking element must be pivoted to place the connecting and anchoring device in the third configuration.

4. The apparatus of claim 3, further comprising a safety mechanism configured for preventing the locking element from being placed in the retracted position unless the safety mechanism is pivoted relative to the spine housing against a second spring bias, thereby to achieve a triggered configuration of the safety mechanism.

5. The apparatus of claim 4, wherein one of the gate termination structure and the spine termination structure comprises a capturing element for receiving, in a void area of said capturing element, the other of the gate termination structure and the spine termination structure in the first and second configurations of the connecting and anchoring device.

6. The apparatus of claim 5, wherein said capturing element is slidably retained on said cable element.

7. The apparatus of claim 3, wherein one of the gate termination structure and the spine termination structure comprises a capturing element for receiving, in a void area of said capturing element, the other of the gate termination structure and the spine termination structure in the first and second configurations of the connecting and anchoring device.

8. The apparatus of claim 7, wherein said capturing element is slidably retained on said cable element.

9. The apparatus of claim 2, further comprising a safety mechanism configured for preventing the locking element from being placed in the retracted position unless the safety mechanism is pivoted relative to the spine housing against a second spring bias, thereby to achieve a triggered configuration of the safety mechanism.

10. The apparatus of claim 9, wherein one of the gate termination structure and the spine termination structure comprises a capturing element for receiving, in a void area of said capturing element, the other of the gate termination structure and the spine termination structure in the first and second configurations of the connecting and anchoring device.

11. The apparatus of claim 10, wherein said capturing element is slidably retained on said cable element.

12. The apparatus of claim 2, wherein one of the gate termination structure and the spine termination structure comprises a capturing element for receiving, in a void area of said capturing element, the other of the gate termination structure and the spine termination structure in the first and second configurations of the connecting and anchoring device.

13. The apparatus of claim 12, wherein said capturing element is slidably retained on said cable element.

14. The apparatus of claim 1, further comprising a safety mechanism configured for preventing the locking element from being placed in the retracted position unless the safety mechanism is pivoted relative to the spine housing against a second spring bias, thereby to achieve a triggered configuration of the safety mechanism.

15. The apparatus of claim 14, wherein the gate housing is enabled for pivoting relative to the spine housing in the third configuration of the connecting and anchoring device by holding the safety mechanism in the triggered configuration of the safety mechanism, and holding the locking element in the retracted configuration of the locking element.

16. The apparatus of claim 15, further comprising a base to which the gate and spine housings are connected, wherein the locking element and the base have corresponding male and female mating features that mutually engage as the gate housing is pivoted relative to the base in the third configuration of the device, and wherein the male and female mating features are configured to allow the gate housing to pivot about the base while maintaining the safety mechanism in the triggered configuration.

17. The apparatus of claim 16, wherein one of the gate termination structure and the spine termination structure comprises a capturing element for receiving, in a void area of said capturing element, the other of the gate termination structure and the spine termination structure in the first and second configurations of the connecting and anchoring device.

18. The apparatus of claim 17, wherein said capturing element is slidably retained on said cable element.

19. The apparatus of claim 15, wherein one of the gate termination structure and the spine termination structure comprises a capturing element for receiving, in a void area of said capturing element, the other of the gate termination structure and the spine termination structure in the first and second configurations of the connecting and anchoring device.

20. The apparatus of claim 19, wherein said capturing element is slidably retained on said cable element.

21. The apparatus of claim 14, wherein one of the gate termination structure and the spine termination structure comprises a capturing element for receiving, in a void area of said capturing element, the other of the gate termination structure and the spine termination structure in the first and second configurations of the connecting and anchoring device.

22. The apparatus of claim 21, wherein said capturing element is slidably retained on said cable element.

23. The apparatus of claim 1, wherein one of the gate termination structure and the spine termination structure comprises a capturing element for receiving, in a void area of said capturing element, the other of the gate termination structure and the spine termination structure in the first and second configurations of the connecting and anchoring device.

24. The apparatus of claim 23, wherein said capturing element is slidably retained on said cable element.

* * * * *